United States Patent
Shi et al.

(10) Patent No.: US 12,374,023 B2
(45) Date of Patent: Jul. 29, 2025

(54) IMAGE RENDERING METHOD AND RELATED DEVICE THEREOF

(71) Applicant: HUAWEI TECHNOLOGIES CO., LTD., Guangdong (CN)

(72) Inventors: Xindong Shi, Hangzhou (CN); Chang Liu, Hangzhou (CN); Yunfei Zhang, Hangzhou (CN); Xiaofeng Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 211 days.

(21) Appl. No.: 18/214,634

(22) Filed: Jun. 27, 2023

(65) Prior Publication Data

US 2023/0343018 A1    Oct. 26, 2023

Related U.S. Application Data

(63) Continuation of application No. PCT/CN2021/140688, filed on Dec. 23, 2021.

(30) Foreign Application Priority Data

Dec. 28, 2020  (CN) .......................... 202011585918.9

(51) Int. Cl.
*G06T 15/08*    (2011.01)
*G06T 7/60*    (2017.01)
(Continued)

(52) U.S. Cl.
CPC .............. *G06T 15/06* (2013.01); *G06T 7/60* (2013.01); *G06T 7/70* (2017.01); *G06T 15/005* (2013.01);
(Continued)

(58) Field of Classification Search
None
See application file for complete search history.

(56) References Cited

U.S. PATENT DOCUMENTS 10,789,759  B2 *  9/2020  Bakalash .................. G06T 7/60
2016/0027203  A1 *  1/2016  Lee ......................... G06T 15/06
345/423
(Continued)

FOREIGN PATENT DOCUMENTS

CN      107256574 A    10/2017
CN      107408312 A    11/2017
(Continued)

OTHER PUBLICATIONS

Subpasses, <URL: https://gavinkg.github.io/ILearnVulkanFromScratchCN/mdroot/Vulkan%20%E8%BF%9B%E9%98%B6/Subpass/Subpass%20%E5%88%9D%E6%AD%A5.html>, 2017, total 6 pages.

(Continued)

*Primary Examiner* — Sultana M Zalalee
(74) *Attorney, Agent, or Firm* — WOMBLE BOND DICKINSON (US) LLP

(57) ABSTRACT

An image rendering method and a related device thereof are disclosed. The method includes: performing ray tracing based on rendering information of a reflecting object, and storing an obtained image of a reflection in the reflecting object in a first frame buffer, where the first frame buffer is used for storing an image that does not need to be displayed temporarily; performing rasterization separately based on the rendering information of the reflecting object and rendering information of a reflected object, and storing an obtained image of the reflecting object and an obtained image of the reflected object in a second frame buffer, where the second frame buffer is used for storing an image to be displayed; and obtaining, from the first frame buffer, the image of the reflection in the reflecting object, and storing the image of the reflection in the reflecting object in the second frame buffer.

20 Claims, 11 Drawing Sheets

(51) Int. Cl.
    *G06T 7/70*          (2017.01)
    *G06T 15/00*        (2011.01)
    *G06T 15/06*        (2011.01)
    *G06T 15/50*        (2011.01)

(52) U.S. Cl.
    CPC ............ *G06T 15/08* (2013.01); *G06T 15/506* (2013.01); *G06T 2207/10024* (2013.01)

(56) References Cited

U.S. PATENT DOCUMENTS

| | | | |
|---|---|---|---|
| 2020/0327712 A1* | 10/2020 | Yoon | G06T 15/04 |
| 2020/0372703 A1* | 11/2020 | Kubisch | G06T 15/06 |
| 2022/0254093 A1* | 8/2022 | Zheng | G06T 15/06 |

FOREIGN PATENT DOCUMENTS

| | | |
|---|---|---|
| CN | 109215106 A | 1/2019 |
| CN | 111340928 A | 6/2020 |

OTHER PUBLICATIONS

João Cabeleira: "Combining Rasterization and Ray Tracing Techniques to Approximate Global illumination in Real-Time", Mar. 16, 2017, pp. 1-10, XP093157275.

Chen Yu et al: "Research on Ray Tracing Rendering Algorithm Based on GPU Accelerated", Apr. 2013, total 12 pages.

* cited by examiner

IMAGE RENDERING METHOD AND RELATED DEVICE THEREOF

CROSS-REFERENCE TO RELATED APPLICATIONS

This application is a continuation of International Application No. PCT/CN2021/140688, filed on Dec. 23, 2021, which claims priority to Chinese Patent Application No. 202011585918.9, filed on Dec. 28, 2020. The disclosures of the aforementioned applications are hereby incorporated by reference in their entireties.

TECHNICAL FIELD

This application relates to the field of computer graphics technologies, and in particular, to an image rendering method and a related device thereof.

BACKGROUND

With rapid development of the computer industry, users have increasingly higher requirements for images. Currently, a three-dimensional scene is generally rendered by using a rasterization technology combined with a ray tracing technology to obtain a realistic image, to improve user experience.

For example, after a central processing unit (CPU) sends rendering information of the three-dimensional scene to a graphics processing unit (GPU), the GPU may first perform rasterization based on the rendering information, and store obtained G-buffer (including images of objects in the scene and geometric information of the objects in screen space) in a first frame buffer. The first frame buffer is used for storing an image that does not need to be displayed temporarily and other information. Then, the GPU obtains the G-buffer from the first frame buffer, and performs ray tracing based on the G-buffer, to obtain images of reflections in some objects (for example, a shadow on the ground or a human image in a mirror). In this way, the GPU may obtain a target image that simulates the three-dimensional scene, where the target image includes the images of the objects in the scene and the images of the reflections in some objects, and store the target image in a second frame buffer. The second frame buffer is used for storing an image to be displayed, and the CPU may obtain the target image from the second frame buffer, and enable the target image to be displayed on a screen for viewing by a user.

In the foregoing process, the GPU needs to complete transmission of the G-buffer (that is, store the G-buffer in the first frame buffer, and extract the G-buffer from the first frame buffer) before obtaining the target image sent for display. The G-buffer includes many pieces of information such as images of all objects, and significant input/output (I/O) overheads are generated during the transmission of the G-buffer, causing excessively high power consumption of image rendering.

SUMMARY

Embodiments of this application provide an image rendering method and a related device thereof, to avoid generation of significant I/O overheads during information transmission, thereby reducing power consumption of image rendering.

A first aspect of embodiments of this application provides an image rendering method, and the method includes:

A CPU may obtain rendering information of a three-dimensional scene. Because the three-dimensional scene usually includes a reflecting object (for example, ground, a mirror, and a lake surface) and a reflected object (for example, a person, a desk, and a chair), the CPU may divide the rendering information of the three-dimensional scene into rendering information of the reflecting object and rendering information of the reflected object. Then, the CPU sends the rendering information of the reflecting object and the rendering information of the reflected object to a GPU.

After obtaining the rendering information of the reflecting object and the rendering information of the reflected object, the GPU performs ray tracing based on the rendering information of the reflecting object to obtain an image of a reflection in the reflecting object. For example, the GPU may perform ray tracing based on rendering information of ground to obtain an image of a human shadow on the ground. After obtaining the image of the reflection in the reflecting object, the GPU may store this image in a first frame buffer. It should be noted that the first frame buffer is an offscreen rendering buffer, that is, is used for storing an image that does not need to be displayed on a screen temporarily. In other words, after drawing the image of the reflection in the reflecting object, the GPU does not need to immediately display the image on the display screen. Instead, the image may be temporarily stored in the first frame buffer.

Next, the GPU performs rasterization separately based on the rendering information of the reflecting object and the rendering information of the reflected object, and correspondingly obtains an image of the reflecting object and an image of the reflected object. For example, the GPU may perform rasterization based on the rendering information of the ground, and perform rasterization based on rendering information of a person, to obtain an image of the ground and an image of the person. After obtaining the image of the reflecting object and the image of the reflected object, the GPU may store these images in a second frame buffer. It should be noted that the second frame buffer is an onscreen rendering buffer, that is, is used for storing an image to be displayed on a screen.

When the GPU stores the image of the reflecting object in the second frame buffer, the GPU needs to extract the image of the reflection in the reflecting object from the first frame buffer, and stores it in the second frame buffer. In this way, the image of the reflecting object, the image of the reflected object, and the image of the reflection in the reflecting object may be fused in the second frame buffer, to form a target image sent for display. For example, the target image includes the image of the ground, the image of the person, and the image of the human shadow on the ground. Therefore, the target image may present a realistic picture of the person on the ground. Next, the CPU may obtain the target image from the second frame buffer, and send the target image to the screen for display for viewing by the user.

It can be learned from the method that after a GPU obtains rendering information of a reflecting object and rendering information of a reflected object, the GPU may first perform ray tracing based on the rendering information of the reflecting object, and store an obtained image of a reflection in the reflecting object in a first frame buffer. Then, the GPU performs rasterization separately based on the rendering information of the reflecting object and the rendering information of the reflected object. When storing an obtained image of the reflecting object and an obtained image of the reflected object in a second frame buffer, the GPU needs to extract an image of a reflection in the reflecting object from the first frame buffer, and store it in the second frame buffer. In this way, the image of the reflecting object, the image of the reflected object, and the image of the reflection in the reflecting object may be fused in the second frame buffer, to obtain a target image sent for display. In the foregoing process, before obtaining the target image sent for display, the GPU only needs to complete transmission of the image of the reflection in the reflecting object (that is, store the image of the reflection in the reflecting object in the first frame buffer, and extract the image of the reflection in the reflecting object from the first frame buffer). The image of the reflection in the reflecting object is only a part of a shadow or mirror of the reflected object, that is, the image of the reflection in the reflecting object includes few information. Therefore, I/O overheads generated during transmitting the image of the reflection in the reflecting object are low, and power consumption of image rendering can be reduced.

In an embodiment, the performing ray tracing based on the rendering information of the reflecting object includes: determining rendering information of a target area in the reflecting object from the rendering information of the reflecting object, where the target area in the reflecting object includes the reflection in the reflecting object; and performing the ray tracing based on the rendering information of the target area in the reflecting object. In the foregoing implementation, the target area in the reflecting object includes the reflection in the reflecting object. In this case, there is no reflection in other area than the target area in the reflecting object. If the GPU performs ray tracing on the other area, calculations (including a ray route calculation, an intersection calculation, and the like) are invalid, and computing power of the GPU is wasted. Therefore, the GPU may determine the rendering information of the target area in the reflecting object from the rendering information of the reflecting object, and perform ray tracing based on the rendering information of the target area in the reflecting object, instead of performing ray tracing based on rendering information of the other area in the reflecting object. In other words, the GPU performs ray tracing only on the target area in the reflecting object, not the other area. In this way, the GPU can avoid invalid calculations, reduce computing power of the GPU, and further reduce power consumption of image rendering.

In an embodiment, the determining rendering information of a target area in the reflecting object from the rendering information of the reflecting object includes: After obtaining the rendering information of the reflected object, the CPU constructs a bounding volume hierarchy (BVH) tree based on the rendering information of the reflected object, and obtains spatial information of a camera that shoots the target image. Next, the CPU may send the BVH tree and the spatial information of the camera to the GPU. Next, because the BVH tree includes spatial information of a plurality of bounding volumes, the GPU determines spatial information of a maximum bounding volume from the BVH tree. Finally, the GPU determines the target area in the reflecting object from the rendering information of the reflecting object based on the spatial information of the maximum bounding volume and the spatial information of the camera. In the foregoing implementation, the GPU may divide the reflecting object into two parts based on the spatial information of the maximum bounding volume and the spatial information of the camera. One part is a target area, and the other part is other area than the target area. Therefore, the GPU may determine the rendering information of the target area in the reflecting object from the rendering information of the reflecting object, and perform ray tracing based on the rendering information of the target area in the reflecting object, to obtain the image of the reflection in the reflecting object.

In an embodiment, the spatial information of the maximum bounding volume includes a vertical height of a first target point and coordinates of the first target point. The spatial information of the camera includes a vertical height of the camera and coordinates of the camera. The rendering information of the target area in the reflecting object includes coordinates of a second target point, and the second target point satisfies the following conditions: a ratio of the vertical height of the camera to a first distance is equal to a ratio of the vertical height of the first target point to a second distance, the first target point is any vertex in the maximum bounding volume, the second target point is any vertex in the target area in the reflecting object, the first distance is determined based on the coordinates of the second target point and the coordinates of the camera, the second distance is a difference between the first distance and a third distance, and the third distance is determined based on the coordinates of the camera and the coordinates of the first target point. In the foregoing implementation, because the target area in the reflecting object includes the reflection in the reflecting object, after a ray emitted by the camera is reflected in the target area in the reflecting object, the reflected ray intersects with the maximum bounding volume. In this case, there is a mathematical relationship between the vertical height of the camera, the vertical height of the first target point (any vertex of the maximum bounding volume) of the maximum bounding volume, a distance between the second target point (any vertex of the target area) and the camera, and a distance between the camera and the first target point. Therefore, the target area in the reflecting object can be accurately determined through the mathematical relationship.

In an embodiment, the rendering information of the reflecting object includes metalness of the reflecting object. The rendering information of the reflected object includes metalness of the reflected object. The metalness of the reflecting object is greater than or equal to a preset threshold. The metalness of the reflected object is less than the preset threshold. In the foregoing implementation, the CPU may classify, based on metalness of each object, a plurality of objects in a three-dimensional scene into two types of objects: a reflecting object and a reflected object. In this way, the CPU may divide rendering information of the three-dimensional scene into rendering information of the reflecting object and rendering information of the reflected object. Because there is generally no reflection in the reflected object, after obtaining the rendering information of the reflecting object and the rendering information of the reflected object, the GPU performs ray tracing only based on the rendering information of the reflecting object, instead of performing ray tracing based on the rendering information of the reflected object. In other words, the GPU performs ray tracing only on the reflecting object, not the reflected object. In this way, invalid calculations are avoided, computing power of the GPU is saved, and power consumption of image rendering is reduced.

In an embodiment, resolution of the image of the reflecting object is the same as resolution of the image of the reflected object, and resolution of the image of the reflection in the reflecting object is less than the resolution of the image of the reflecting object. In the foregoing implementation, when performing ray tracing, the higher resolution of an image that needs to be rendered, the more rays that need to be emitted, and the more calculations that are involved.

Therefore, the resolution of the image that needs to be rendered may be lowered, to reduce the calculations, reduce computing power of the GPU and further reduce power consumption of image rendering.

In an embodiment, the rendering information of the reflecting object further includes coordinates of a vertex of the reflecting object, a vertex normal of the reflecting object, a triangle index of the reflecting object, roughness of the reflecting object, and a color of the reflecting object. The rendering information of the reflected object further includes coordinates of a vertex of the reflected object, a vertex normal of the reflected object, a triangle index of the reflected object, roughness of the reflected object, and a color of the reflected object.

A second aspect of embodiments of this application provides an image rendering method, and the method includes:

A CPU may obtain rendering information of a three-dimensional scene. Because the three-dimensional scene usually includes a second reflecting object (for example, a mirror, and a lake surface) and a reflected object (for example, a person, a desk, and a chair), the CPU may divide the rendering information of the three-dimensional scene into rendering information of the second reflecting object and rendering information of the reflected object. Then, the CPU sends the rendering information of the second reflecting object and the rendering information of the reflected object to a GPU.

After obtaining the rendering information of the second reflecting object and the rendering information of the reflected object, the GPU performs rasterization separately based on the rendering information of the second reflecting object and the rendering information of the reflected object, and correspondingly obtains an image of the second reflecting object and an image of the reflected object. For example, the GPU may perform rasterization based on rendering information of a mirror, and perform rasterization based on rendering information of a person, to obtain an image of the mirror and an image of the person. After obtaining the image of the second reflecting object and the image of the reflected object, the GPU stores these images in a second frame buffer. The second frame buffer is an onscreen rendering buffer, that is, is used for storing an image to be displayed on a screen.

When the GPU performs rasterization, the GPU may further perform ray tracing based on the rendering information of the second reflecting object, to obtain an image of a reflection in the second reflecting object. For example, the GPU may perform ray tracing based on the rendering information of the mirror, to obtain an image of the person in the mirror. After obtaining the image of the reflection in the reflecting object, the GPU may store this image in a second frame buffer. In this way, the image of the second reflecting object, the image of the reflected object, and the image of the reflection in the second reflecting object may be fused in the second frame buffer, to obtain a target image sent for display. For example, the target image includes the image of the mirror, the image of the person, and the image of the person in the mirror. Therefore, the target image may present a realistic picture of the person in front of the mirror. Next, the CPU may obtain the target image from the second frame buffer, and send the target image to the screen for display for viewing by the user.

It can be learned from the method that after a GPU obtains rendering information of a second reflecting object and rendering information of a reflected object, the GPU performs rasterization based on the rendering information of the second reflecting object and the rendering information of the reflected object, and stores an obtained image of the second reflecting object and an obtained image of the reflected object in a second frame buffer. In addition, the GPU may further perform ray tracing based on the rendering information of the second reflecting object, and store an obtained image of a reflection in the second reflecting object in the second frame buffer. In this way, the image of the second reflecting object, the image of the reflected object, and the image of the reflection in the second reflecting object may be fused in the second frame buffer, to obtain a target image sent for display. In the foregoing process, before obtaining the target image sent for display, the GPU does not need to store an image in a first frame buffer (used for storing an image that does not need to be displayed on a screen temporarily) or extract an image from the first frame buffer, so that I/O overheads can be effectively reduced, to reduce power consumption of image rendering.

In an embodiment, the method further includes: obtaining rendering information of a first reflecting object, where a reflection type of the first reflecting object is different from a reflection type of the second reflecting object; performing ray tracing based on the rendering information of the first reflecting object, and storing an obtained image of a reflection in the first reflecting object in a first frame buffer, where the first frame buffer is used for storing an image that does not need to be displayed temporarily; performing rasterization based on the rendering information of the first reflecting object, and storing an obtained image of the first reflecting object in the second frame buffer; and obtaining the image of the reflection in the first reflecting object from the first frame buffer, and storing the image of the reflection in the first reflecting object in the second frame buffer, so that the image of the second reflecting object, the image of the reflected object, the image of the first reflecting object, the image of the reflection in the second reflecting object, and the image of the reflection in the first reflecting object are fused to obtain the target image.

In an embodiment, the GPU may simultaneously obtain the rendering information of the second reflecting object, the rendering information of the reflected object, and the rendering information of the first reflecting object. Generally, a reflection type of the first reflecting object is diffuse reflection, and a reflection type of the second reflecting object is specular reflection. For example, the first reflecting object is ground, and the second reflecting object is a mirror. Next, the GPU may first perform ray tracing based on the rendering information of the first reflecting object, and store the obtained image of the reflection in the first reflecting object in the first frame buffer. Next, the GPU performs rasterization separately based on the rendering information of the second reflecting object, the rendering information of the first reflecting object, and the rendering information of the reflected object, and performs ray tracing based on the rendering information of the second reflecting object. After obtaining, to store the image of the second reflecting object, the image of the first reflecting object, the image of the reflected object, and the image of the reflection in the second reflecting object in the second frame buffer, the GPU needs to extract the image of the reflection in the first reflecting object from the first frame buffer, and store it in the second frame buffer. In this way, the image of the second reflecting object, the image of the first reflecting object, the image of the reflected object, the image of the reflection in the second reflecting object, and the image of the reflection in the first reflecting object may be fused in the second frame buffer, to obtain a target image sent for display. For example, the target image includes an image of ground, an image of a mirror, an image of a person, an image of a human shadow on the ground, and an image of the person in the mirror. Therefore, the target image may present a picture in which the person stands on the ground and looks in the mirror.

In the foregoing process, before obtaining the target image sent for display, the GPU only needs to complete transmission of the image of the reflection in the first reflecting object (that is, store the image of the reflection in the first reflecting object in the first frame buffer, and extract the image of the reflection in the first reflecting object from the first frame buffer). The image of the reflection in the first reflecting object is only a part of a shadow of the reflected object, that is, the image of the reflection in the reflecting object includes few information. Therefore, I/O overheads generated during transmitting the image of the reflection in the first reflecting object are low, and power consumption of image rendering can be reduced.

In an embodiment, the performing ray tracing based on the rendering information of the second reflecting object includes: determining rendering information of a target area in the second reflecting object from the rendering information of the second reflecting object, where the target area in the second reflecting object includes the reflection in the second reflecting object; and performing the ray tracing based on the rendering information of the target area in the second reflecting object.

In an embodiment, the determining rendering information of a target area in the second reflecting object from the rendering information of the second reflecting object includes: obtaining a BVH tree and spatial information of a camera, where the BVH tree is constructed based on the rendering information of the reflected object, and the camera is configured to shoot the target image; determining spatial information of a maximum bounding volume from the BVH tree; and determining, based on the spatial information of the maximum bounding volume and the spatial information of the camera, the rendering information of the target area in the second reflecting object from the rendering information of the second reflecting object.

In an embodiment, the spatial information of the maximum bounding volume includes a vertical height of a first target point and coordinates of the first target point. The spatial information of the camera includes a vertical height of the camera and coordinates of the camera. The rendering information of the target area in the second reflecting object includes coordinates of a second target point, and the second target point satisfies the following conditions: a ratio of the vertical height of the camera to a first distance is equal to a ratio of the vertical height of the first target point to a second distance, the first target point is any vertex in the maximum bounding volume, the second target point is any vertex in the target area in the second reflecting object, the first distance is determined based on the coordinates of the second target point and the coordinates of the camera, the second distance is a difference between the first distance and a third distance, and the third distance is determined based on the coordinates of the camera and the coordinates of the first target point.

In an embodiment, the performing ray tracing based on the rendering information of the first reflecting object includes: determining rendering information of a target area in the first reflecting object from the rendering information of the first reflecting object, where the target area in the first reflecting object includes the reflection in the first reflecting object; and performing the ray tracing based on the rendering information of the target area in the first reflecting object.

In an embodiment, the determining rendering information of a target area in the first reflecting object from the rendering information of the first reflecting object includes: obtaining the BVH tree and the spatial information of the camera; determining the spatial information of the maximum bounding volume from the BVH tree; and determining, based on the spatial information of the maximum bounding volume and the spatial information of the camera, the rendering information of the target area in the first reflecting object from the rendering information of the first reflecting object.

In an embodiment, the rendering information of the target area in the first reflecting object includes coordinates of a third target point, and the third target point satisfies the following conditions: a ratio of the vertical height of the camera to a fourth distance is equal to a ratio of the vertical height of the first target point to a fifth distance, the third target point is any vertex in the target area in the first reflecting object, the fourth distance is determined based on the coordinates of the third target point and the coordinates of the camera, and the fifth distance is a difference between the fourth distance and the third distance.

In an embodiment, the rendering information of the second reflecting object includes metalness of the second reflecting object and roughness of the second reflecting object. The rendering information of the reflected object includes metalness of the reflected object and roughness of the reflected object. The rendering information of the first reflecting object includes metalness of the first reflecting object and roughness of the first reflecting object. The metalness of the first reflecting object is greater than or equal to a preset first threshold and is less than a preset second threshold. The metalness of the second reflecting object is greater than or equal to the preset second threshold. The metalness of the reflected object is less than the preset first threshold. The roughness of the second reflecting object is less than a preset third threshold. The roughness of the first reflecting object is greater than or equal to the preset third threshold.

In an embodiment, resolution of the image of the second reflecting object, resolution of the image of the reflected object, resolution of the image of the first reflecting object, and resolution of the image of the reflection in the second reflecting object are the same. Resolution of the image of the reflection in the first reflecting object is less than the resolution of the image of the first reflecting object.

In an embodiment, the rendering information of the second reflecting object further includes coordinates of a vertex of the second reflecting object, a vertex normal of the second reflecting object, a triangle index of the second reflecting object, and a color of the second reflecting object. Spatial information of the reflected object includes coordinates of a vertex of the reflected object, a vertex normal of the reflected object, a triangle index of the reflected object, and a color of the reflected object. Spatial information of the first reflecting object includes coordinates of a vertex of the first reflecting object, a vertex normal of the first reflecting object, a triangle index of the first reflecting object, and a color of the first reflecting object.

A third aspect of embodiments of this application provides an electronic device. The electronic device includes an obtaining module and a processing module. The obtaining module is configured to obtain rendering information of a reflecting object and rendering information of a reflected object. The processing module is configured to perform ray tracing based on the rendering information of the reflecting object, and store an obtained image of a reflection in the reflecting object in a first frame buffer, where the first frame buffer is used for storing an image that does not need to be displayed temporarily. The processing module is further configured to perform rasterization separately based on the rendering information of the reflecting object and the rendering information of the reflected object, and store an obtained image of the reflecting object and an obtained image of the reflected object in a second frame buffer, where the second frame buffer is used for storing an image to be displayed. The processing module is further configured to obtain the image of the reflection in the reflecting object from the first frame buffer, and store the image of the reflection in the reflecting object in the second frame buffer, so that the image of the reflecting object, the image of the reflected object, and the image of the reflection in the reflecting object are fused to obtain a target image.

In an embodiment, the processing module is configured to: determine rendering information of a target area in the reflecting object from the rendering information of the reflecting object, where the target area in the reflecting object includes the reflection in the reflecting object; and perform the ray tracing based on the rendering information of the target area in the reflecting object.

In an embodiment, the processing module is configured to: obtain a bounding volume hierarchy BVH tree and spatial information of a camera, where the BVH tree is constructed based on the rendering information of the reflected object, and the camera is configured to shoot the target image; determine spatial information of a maximum bounding volume from the BVH tree; and determine, based on the spatial information of the maximum bounding volume and the spatial information of the camera, the rendering information of the target area in the reflecting object from the rendering information of the reflecting object.

In an embodiment, the spatial information of the maximum bounding volume includes a vertical height of a first target point and coordinates of the first target point. The spatial information of the camera includes a vertical height of the camera and coordinates of the camera. The rendering information of the target area in the reflecting object includes coordinates of a second target point, and the second target point satisfies the following conditions: a ratio of the vertical height of the camera to a first distance is equal to a ratio of the vertical height of the first target point to a second distance, the first target point is any vertex in the maximum bounding volume, the second target point is any vertex in the target area in the reflecting object, the first distance is a distance between the second target point and the camera, the first distance is determined based on the coordinates of the second target point and the coordinates of the camera, the second distance is a difference between the first distance and a third distance, and the third distance is determined based on the coordinates of the camera and the coordinates of the first target point.

In an embodiment, the rendering information of the reflecting object includes metalness of the reflecting object. The rendering information of the reflected object includes metalness of the reflected object. The metalness of the reflecting object is greater than or equal to a preset threshold. The metalness of the reflected object is less than the preset threshold.

In an embodiment, resolution of the image of the reflecting object is the same as resolution of the image of the reflected object, and resolution of the image of the reflection in the reflecting object is less than the resolution of the image of the reflecting object.

In an embodiment, the rendering information of the reflecting object further includes coordinates of a vertex of the reflecting object, a vertex normal of the reflecting object, a triangle index of the reflecting object, roughness of the reflecting object, and a color of the reflecting object. The rendering information of the reflected object further includes coordinates of a vertex of the reflected object, a vertex normal of the reflected object, a triangle index of the reflected object, roughness of the reflected object, and a color of the reflected object.

A fourth aspect of embodiments of this application provides an electronic device. The electronic device includes an obtaining module and a processing module. The obtaining module is configured to obtain rendering information of a second reflecting object and rendering information of a reflected object. The processing module is configured to perform rasterization separately based on the rendering information of the second reflecting object and the rendering information of the reflected object, and store an obtained image of the second reflecting object and an obtained image of the reflected object in a second frame buffer, where the second frame buffer is used for storing an image to be displayed. The processing module is further configured to perform ray tracing based on the rendering information of the second reflecting object, and store an obtained image of a reflection in the second reflecting object in the second frame buffer, so that the image of the second reflecting object, the image of the reflected object, and the image of the reflection in the second reflecting object are fused to obtain a target image.

In an embodiment, the processing module is configured to: determine rendering information of a target area in the second reflecting object from the rendering information of the second reflecting object, where the target area in the second reflecting object includes the reflection in the second reflecting object; and perform the ray tracing based on the rendering information of the target area in the second reflecting object.

In an embodiment, the processing module is configured to: obtain a BVH tree and spatial information of a camera, where the BVH tree is constructed based on the rendering information of the reflected object, and the camera is configured to shoot the target image; determine spatial information of a maximum bounding volume from the BVH tree; and determine, based on the spatial information of the maximum bounding volume and the spatial information of the camera, the rendering information of the target area in the second reflecting object from the rendering information of the second reflecting object.

In an embodiment, the spatial information of the maximum bounding volume includes a vertical height of a first target point and coordinates of the first target point. The spatial information of the camera includes a vertical height of the camera and coordinates of the camera. The rendering information of the target area in the second reflecting object includes coordinates of a second target point, and the second target point satisfies the following conditions: a ratio of the vertical height of the camera to a first distance is equal to a ratio of the vertical height of the first target point to a second distance, the first target point is any vertex in the maximum bounding volume, the second target point is any vertex in the target area in the second reflecting object, the first distance is a distance between the second target point and the camera, the first distance is determined based on the coordinates of the second target point and the coordinates of the camera, the second distance is a difference between the first distance and a third distance, and the third distance is determined based on the coordinates of the camera and the coordinates of the first target point.

In an embodiment, the obtaining module is further configured to obtain rendering information of a first reflecting object, where a reflection type of the first reflecting object is different from a reflection type of the second reflecting object. The processing module is further configured to: perform ray tracing based on the rendering information of the first reflecting object, and store an obtained image of a reflection in the first reflecting object in a first frame buffer, where the first frame buffer is used for storing an image that does not need to be displayed temporarily; perform rasterization based on the rendering information of the first reflecting object, and store an obtained image of the first reflecting object in the second frame buffer; and obtain the image of the reflection in the first reflecting object from the first frame buffer, and store the image of the reflection in the first reflecting object in the second frame buffer, so that the image of the second reflecting object, the image of the reflected object, the image of the first reflecting object, the image of the reflection in the second reflecting object, and the image of the reflection in the first reflecting object are fused to obtain the target image.

In an embodiment, the processing module is configured to: determine rendering information of a target area in the first reflecting object from the rendering information of the first reflecting object, where the target area in the first reflecting object includes the reflection in the first reflecting object; and perform the ray tracing based on the rendering information of the target area in the first reflecting object.

In an embodiment, the processing module is configured to: obtain the BVH tree and the spatial information of the camera; determine the spatial information of the maximum bounding volume from the BVH tree; and determine, based on the spatial information of the maximum bounding volume and the spatial information of the camera, the rendering information of the target area in the first reflecting object from the rendering information of the first reflecting object.

In an embodiment, the rendering information of the target area in the first reflecting object includes coordinates of a third target point, and the third target point satisfies the following conditions: a ratio of the vertical height of the camera to a fourth distance is equal to a ratio of the vertical height of the first target point to a fifth distance, the third target point is any vertex in the target area in the first reflecting object, the fourth distance is a distance between the third target point and the camera, the fourth distance is determined based on the coordinates of the third target point and the coordinates of the camera, and the fifth distance is a difference between the fourth distance and the third distance.

In an embodiment, the rendering information of the second reflecting object includes metalness of the second reflecting object and roughness of the second reflecting object. The rendering information of the reflected object includes metalness of the reflected object and roughness of the reflected object. The rendering information of the first reflecting object includes metalness of the first reflecting object and roughness of the first reflecting object. The metalness of the first reflecting object is greater than or equal to a preset first threshold and is less than a preset second threshold. The metalness of the second reflecting object is greater than or equal to the preset second threshold. The metalness of the reflected object is less than the preset first threshold. The roughness of the second reflecting object is less than a preset third threshold. The roughness of the first reflecting object is greater than or equal to the preset third threshold.

In an embodiment, resolution of the image of the second reflecting object, resolution of the image of the reflected object, resolution of the image of the first reflecting object, and resolution of the image of the reflection in the second reflecting object are the same. Resolution of the image of the reflection in the first reflecting object is less than the resolution of the image of the first reflecting object.

In an embodiment, the rendering information of the second reflecting object further includes coordinates of a vertex of the second reflecting object, a vertex normal of the second reflecting object, a triangle index of the second reflecting object, and a color of the second reflecting object. Spatial information of the reflected object includes coordinates of a vertex of the reflected object, a vertex normal of the reflected object, a triangle index of the reflected object, and a color of the reflected object. Spatial information of the first reflecting object includes coordinates of a vertex of the first reflecting object, a vertex normal of the first reflecting object, a triangle index of the first reflecting object, and a color of the first reflecting object.

A fifth aspect of embodiments of this application provides an electronic device. The electronic device includes a memory and a processor. The memory stores code. The processor is configured to execute the code. When the code is executed, the electronic device performs the method according to any one of the first aspect, the possible implementations of the first aspect, the second aspect, or the possible implementations of the second aspect.

A sixth aspect of embodiments of this application provides a computer-readable storage medium, including computer-readable instructions. When the computer-readable instructions are run on a computer, the computer is enabled to perform the method according to any one of the first aspect, the possible implementations of the first aspect, the second aspect, or the possible implementations of the second aspect.

A seventh aspect of embodiments of this application provides a computer program product, including computer-readable instructions. When the computer-readable instructions are run on a computer, the computer is enabled to perform the method according to any one of the first aspect, the possible implementations of the first aspect, the second aspect, or the possible implementations of the second aspect.

In embodiments of this application, after a GPU obtains rendering information of a reflecting object and rendering information of a reflected object, the GPU may first perform ray tracing based on the rendering information of the reflecting object, and store an obtained image of a reflection in the reflecting object in a first frame buffer. Then, the GPU performs rasterization separately based on the rendering information of the reflecting object and the rendering information of the reflected object. When storing an obtained image of the reflecting object and an obtained image of the reflected object in a second frame buffer, the GPU needs to extract an image of a reflection in the reflecting object from the first frame buffer, and store it in the second frame buffer. In this way, the image of the reflecting object, the image of the reflected object, and the image of the reflection in the reflecting object may be fused in the second frame buffer, to obtain a target image sent for display. In the foregoing process, before obtaining the target image sent for display, the GPU only needs to complete transmission of the image of the reflection in the reflecting object (that is, store the image of the reflection in the reflecting object in the first frame buffer, and extract the image of the reflection in the reflecting object from the first frame buffer). The image of the reflection in the reflecting object is only a part of a shadow or mirror of the reflected object, that is, the image of the reflection in the reflecting object includes few information. Therefore, I/O overheads generated during transmitting the image of the reflection in the reflecting object are low, and power consumption of image rendering can be reduced.

DESCRIPTION OF EMBODIMENTS

The following describes technical solutions in embodiments of this application in detail with reference to the accompanying drawings in embodiments of this application.

In the specification, claims, and accompanying drawings of this application, terms "first", "second", and so on are intended to distinguish between similar objects but do not necessarily indicate an order or sequence. It should be understood that the data used in such a way are interchangeable in appropriate circumstances, so that embodiments described herein can be implemented in an order other than those illustrated or described herein. Moreover, terms "include", "comprise", and any other variant thereof are intended to cover non-exclusive inclusion. For example, a process, a method, a system, a product, or a device that includes a series of operations or modules is not necessarily limited to those expressly listed operations or modules, but may include other operations or modules not expressly listed or inherent to the process, the method, the product, or the device. Names or numbers of operations in this application do not mean that the operations in the method procedure need to be performed in a time/logical sequence indicated by the names or numbers. An execution sequence of the operations in the procedure that have been named or numbered can be changed based on a technical objective to be achieved, provided that same or similar technical effects can be achieved.

With development of computer technologies, more and more applications, such as a game application or a video application, require that an electronic device display images with excellent image quality. Generally, the electronic device performs rendering based on a model in a three-dimensional (3D) scene to obtain these images.

In a conventional image processing method, rasterization processing is generally used to render a 3D scene, to obtain an image that can display the 3D scene. However, quality of an image obtained by performing rendering through the rasterization technology is bad, and it is usually difficult to present a realistic picture. For example, it is usually difficult to realistically reproduce effects of light reflection, refraction, shadow and the like in a scene in an image obtained through rendering. For this reason, a new rendering technology-ray tracing technology emerges. Both the ray tracing technology and the rasterization technology are methods for implementing image rendering, and their main purpose is to project an object in a 3D space to a two-dimensional screen space for display via shading calculation.

Figure 1:
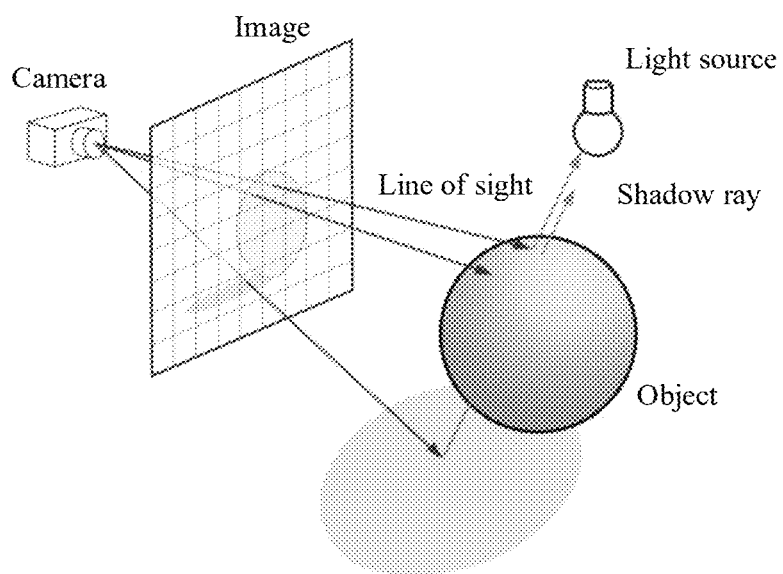
FIG. 1 is a schematic principle diagram of a ray tracing technology.

FIG. 1 is a schematic principle diagram of a ray tracing technology. As shown in FIG. 1, a principle of ray tracing is as follows: A ray of light is emitted from a camera position, through a pixel position on an image plane and to a three-dimensional scene. A nearest intersection between the ray and a geometric shape is obtained, and then shading of the intersection is calculated. If the intersection is reflective, tracing may continue in a reflection direction of the intersection, and shading of the intersection after reflection continues to be calculated. That is, in the ray tracing method, projection and global illumination are calculated by tracing propagation of a ray in a three-dimensional scene, to obtain a two-dimensional image through rendering.

Figure 2:
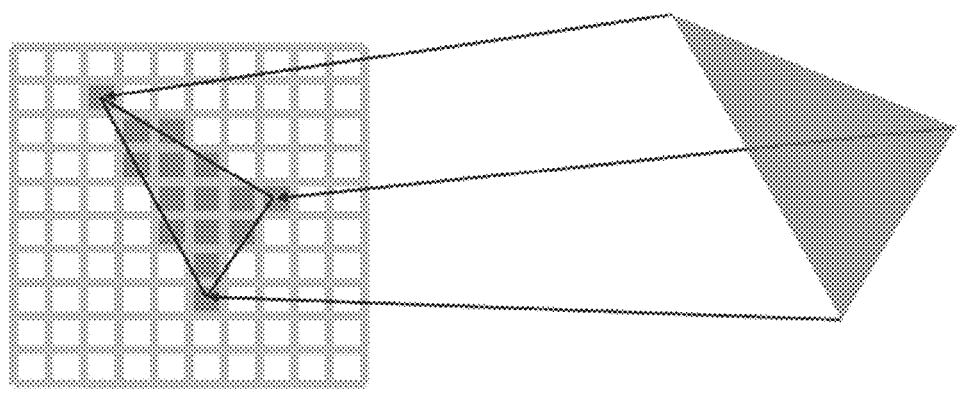
FIG. 2 is a schematic principle diagram of a rasterization technology.

FIG. 2 is a schematic principle diagram of a rasterization technology. As shown in FIG. 2, a principle of rasterization processing is as follows: An object in a three-dimensional scene is segmented through a triangle. Three-dimensional coordinates of each vertex of the triangle are transformed into two-dimensional coordinates on an image through coordinate transformation. Finally, texture is filled in the triangle on the image, to implement image rendering.

Because the rasterization technology is to directly project visible content in screen space to the screen space to obtain a corresponding image, the processing difficulty is low, and the provided light and shadow effect is also poor. The ray tracing technology implements real effects such as reflection, refraction, shadow, and ambient light shielding by tracing each ray emitted from a camera. Therefore, the ray tracing method can provide a real and realistic light and shadow effect. Therefore, currently, to obtain a realistic image by rendering, an electronic device generally renders a three-dimensional scene by using a rasterization technology combined with a ray tracing technology, to improve viewing experience of a user.

For example, after a CPU of the electronic device sends rendering information of the three-dimensional scene to a GPU of the electronic device, the GPU may first perform rasterization based on the rendering information, and store obtained G-buffer (including images of objects in the three-dimensional scene and geometric information of the objects in screen space) in a first frame buffer. The first frame buffer is used for storing an image that does not need to be displayed temporarily and other information. Next, the GPU obtains the G-buffer from the first frame buffer, and performs ray tracing based on the G-buffer, to obtain images of reflections in some objects (for example, a shadow on the ground or a human image in a mirror). In this way, the GPU may obtain a target image that simulates the three-dimensional scene, where the target image includes the images of the objects in the scene and the images of the reflections in some objects, and store the target image in a second frame buffer. The second frame buffer is used for storing an image to be displayed, and the CPU may obtain the target image from the second frame buffer, and enable the target image to be displayed on a screen of the electronic device for viewing by a user.

In the foregoing process, the GPU needs to complete transmission of the G-buffer (that is, store the G-buffer in the first frame buffer, and extract the G-buffer from the first frame buffer) before obtaining the target image sent for display. The G-buffer includes many pieces of information such as images of all objects, and significant input/output (I/O) overheads are generated during the transmission of the G-buffer, causing excessively high power consumption of image rendering.

To resolve the foregoing problem, an embodiment of this application provides an image rendering method. The method may be performed by an electronic device. The electronic device includes a CPU and a GPU, and can perform rendering processing on an image. For example, the electronic device may be a mobile phone, a tablet computer, a notebook computer, a PC, a mobile internet device (MID), a wearable device, a virtual reality (virtual reality, VR) device, an augmented reality (AR) device, a wireless electronic device in industrial control, a wireless electronic device in self-driving (self-driving), a wireless electronic device in remote surgery (remote medical surgery), a wireless electronic device in a smart grid, a wireless electronic device in transportation safety, a wireless electronic device in a smart city, a wireless electronic device in a smart home, or the like. The electronic device may be a device that runs an Android system, an IOS system, a windows system, or another system. An application that needs to render a 3D scene to obtain a two-dimensional image may run in the electronic device, such as a game application, a screen locking application, a map application, or a monitoring application.

Figure 3:
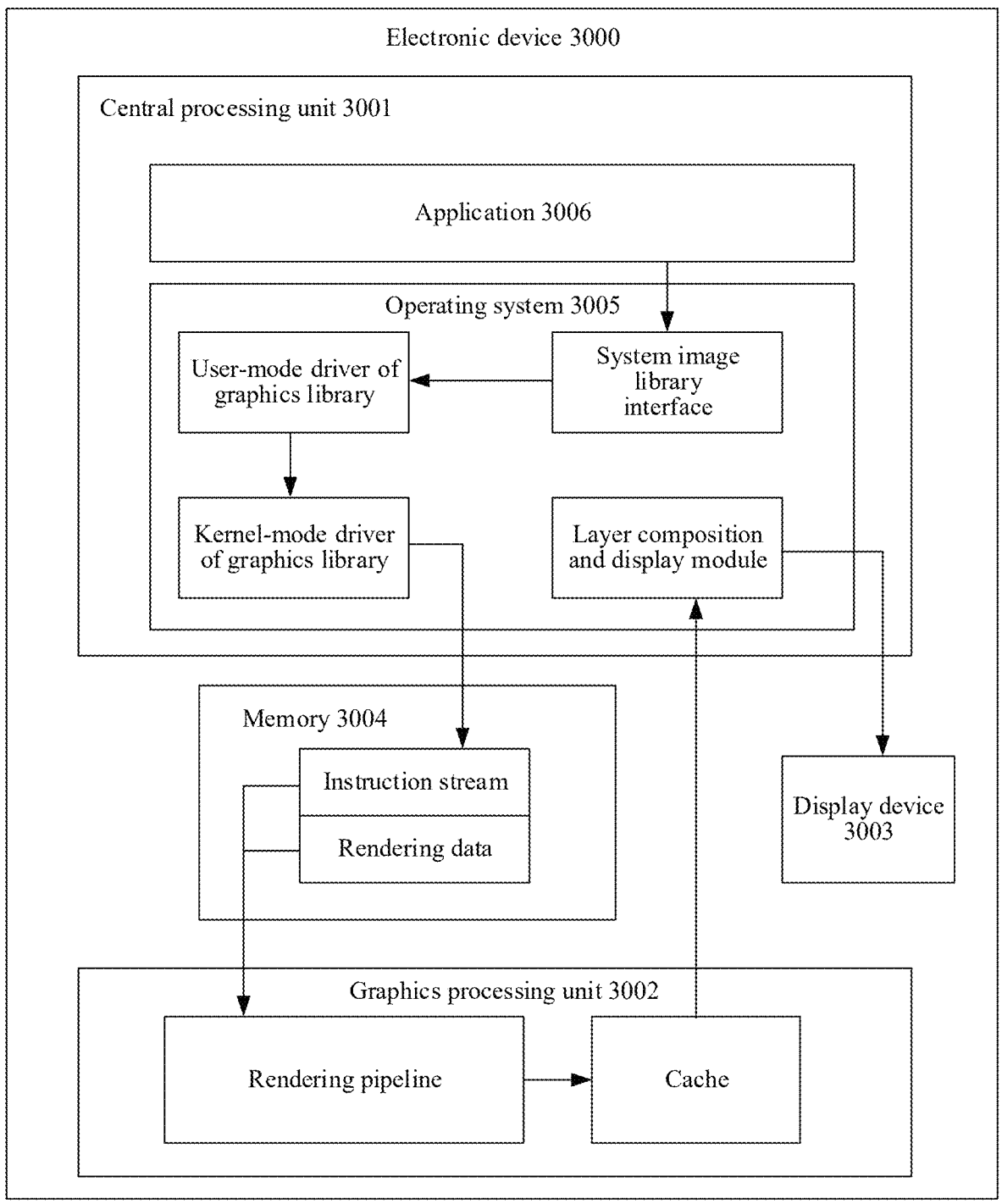
FIG. 3 is a schematic structural diagram of an electronic device according to an embodiment of this application.

For ease of understanding, a structure of the electronic device is described in detail below with reference to FIG. 3. FIG. 3 is a schematic structural diagram of an electronic device according to an embodiment of this application. As shown in FIG. 3, an electronic device 3000 may include a central processing unit 3001, a graphics processing unit 3002, a display device 3003, and a memory 3004. In an embodiment, the electronic device 3000 may further include at least one communication bus (not shown in FIG. 3), configured to implement connection and communication between various components.

It should be understood that alternatively, the components in the electronic device 3000 may be coupled via another connector, and the another connector may include various interfaces, transmission lines, buses, or the like. The components in the electronic device 3000 may alternatively be connected in a radioactive manner by using the central processing unit 3001 as a center. In embodiments of this application, coupling refers to mutual electrical connection or communication, including direct connection or indirect connection via another device.

The central processing unit 3001 and the graphics processing unit 3002 may also be connected in a plurality of manners, not limited to the manner shown in FIG. 2. The central processing unit 3001 and the graphics processing unit 3002 in the electronic device 3000 may be located on a same chip, or each may be an independent chip.

Functions of the central processing unit 3001, the graphics processing unit 3002, the display device 3003, and the memory 3004 are briefly described below.

The central processing unit 3001 is configured to run an operating system 3005 and an application 3006. The application 3006 may be a graphics-type application, such as a game or a video player. The operating system 3005 provides a system graphics library interface. The application 3006 generates an instruction stream used to render a graphic or an image frame and required related rendering data through the system graphics library interface and a driver provided by the operating system 3005, such as a user-mode driver of graphics library and/or a kernel-mode driver of graphics library. The system graphics library includes, but is not limited to, a system graphics library such as an open graphics library for embedded system (OpenGL ES), the khronos platform graphics interface (the khronos platform graphics interface), or Vulkan (a cross-platform drawing application interface). The instruction stream includes a series of instructions, and these instructions are usually instructions for calling the system graphics library interface.

In an embodiment, the central processing unit 3001 may include at least one of the following types of processors: an application processor, one or more microprocessors, a digital signal processor (DSP), a microcontroller (MCU), an artificial intelligence processor, or the like.

The central processing unit 3001 may further include a necessary hardware accelerator, for example, an application-specific integrated circuit (ASIC), a field programmable gate array (FPGA), or an integrated circuit configured to implement a logical operation. The processor 3001 may be coupled to one or more data buses, and a bus is configured to transmit data and instructions between various components in the electronic device 3000.

The graphics processing unit 3002 is configured to: receive a graphics instruction stream sent by the processor 3001, generate a rendering target through a rendering pipeline, and display the rendering target on the display device 3003 through a layer composition and display module of the operating system. The rendering pipeline may also be referred to as a rendering flowline, a pixel flowline, or a pixel pipeline, and is a parallel processing unit configured to process a graphics signal in the graphics processing unit 3002. The graphics processing unit 3002 may include a plurality of rendering pipelines, and the plurality of rendering pipelines may independently process graphics signals in parallel. For example, the rendering pipeline may perform some column operations in a process of rendering a graphic or image frame. Typical operations may include vertex processing, primitive processing, rasterization, fragment processing, and the like.

In an embodiment, the graphics processing unit 3002 may include a general-purpose graphics processing unit that executes software, such as a GPU or another type of dedicated graphics processing unit.

The display device 3003 is configured to display various images generated by the electronic device 3000. The image may be a graphical user interface (GUI) of the operating system or image data (including a still image and video data) processed by the graphics processing unit 3002.

In an embodiment, the display device 3003 may include any suitable type of display screen, such as a liquid crystal display (LCD), a plasma display, or an organic light-emitting diode (OLED) display.

The memory 3004 is a transmission channel between the central processing unit 3001 and the graphics processing unit 3002, and may be a double data rate synchronous dynamic random access memory (DDR SDRAM) or another type of cache.

A structure of an electronic device to which the image rendering method provided in an embodiment of the application is applied is described above. A procedure of the image rendering method provided in an embodiment of the application is described in detail below. First, several terms involved in the following are explained:

Offscreen render pass: An image obtained by rendering through an offscreen render pass is generally an image that does not need to be displayed on a screen temporarily. This image may be stored in a frame buffer (allocated to the offscreen render pass. For ease of description, the frame buffer is referred to as a first frame buffer in the following, and the first frame buffer may also be referred to as an offscreen rendering buffer, used for storing an image that does not need to be displayed on a screen temporarily. In this application, the offscreen render pass may be configured to implement a ray tracing technology.

Onscreen render pass: An image obtained by rendering through an onscreen render pass is generally an image to be displayed on a screen (that is, an image sent for display). This image may be stored in a frame buffer allocated to the onscreen render pass. For ease of description, the frame buffer is referred to as a second frame buffer in the following, and the second frame buffer may also be referred to as an onscreen rendering buffer, used for storing an image to be displayed on a screen. In this application, the onscreen render pass may be configured to implement a rasterization technology, or may be configured to implement a ray tracing technology.

Three different application scenarios may be constructed based on the foregoing render passes. In a first application scenario, the electronic device may implement a ray tracing technology through an offscreen render pass, and implement a rasterization technology through an onscreen render pass, to render a target image sent for display. In a second application scenario, the electronic device may implement a ray tracing technology and a rasterization technology through an onscreen render pass, to render a target image sent for display. In a third application scenario, the electronic device may implement a ray tracing technology through an offscreen render pass, and implement a ray tracing technology and a rasterization technology through an onscreen render pass, to render a target image sent for display.

Figure 4:
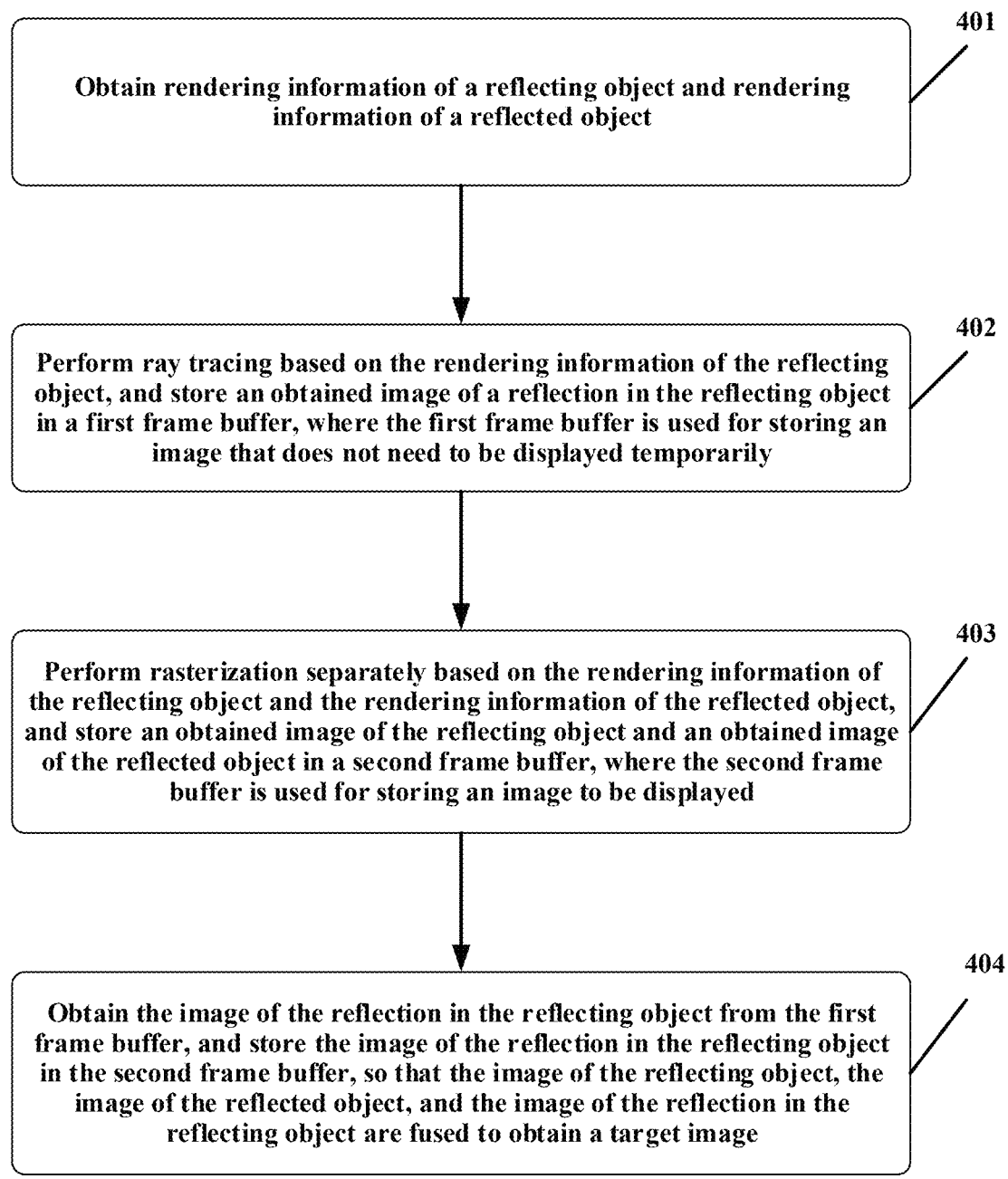
FIG. 4 is a schematic flowchart of an image rendering method according to an embodiment of this application.

The first application scenario is described first below. FIG. 4 is a schematic flowchart of an image rendering method according to an embodiment of this application. As shown in FIG. 4, the method includes the following operations.

401: Obtain rendering information of a reflecting object and rendering information of a reflected object.

After obtaining a model file of a three-dimensional scene, a CPU of an electronic device may parse out rendering information of objects in the three-dimensional scene from the model file. The rendering information of each object includes spatial information of the object and material information of the object. The spatial information of the object includes information such as vertex coordinates of the object, a normal of vertex of the object, and a triangle index. The material information of the object includes information such as a color of the object, metalness of the object, and roughness of the object.

After obtaining the material information of the object, the CPU may determine a category of the object based on the material information of the object. For example, after obtaining material information of an object, the CPU may determine, based on metalness of the object, whether the object is a reflecting object. If the metalness of the object is greater than or equal to a preset threshold, the CPU may determine that the object is a reflecting object. If the metalness of the object is less than the preset threshold, the CPU may determine that the object is a reflected object. For example, metalness of an object such as ground, a mirror, and a lake is usually greater than the preset threshold, and therefore the object may be referred to as a reflecting object. Metalness of an object such as a person and a table is usually less than the preset threshold, and therefore the object may be referred to as a reflected object. In this way, the CPU may classify a plurality of objects in the three-dimensional scene into two types of objects: a reflecting object and a reflected object.

Figure 5:
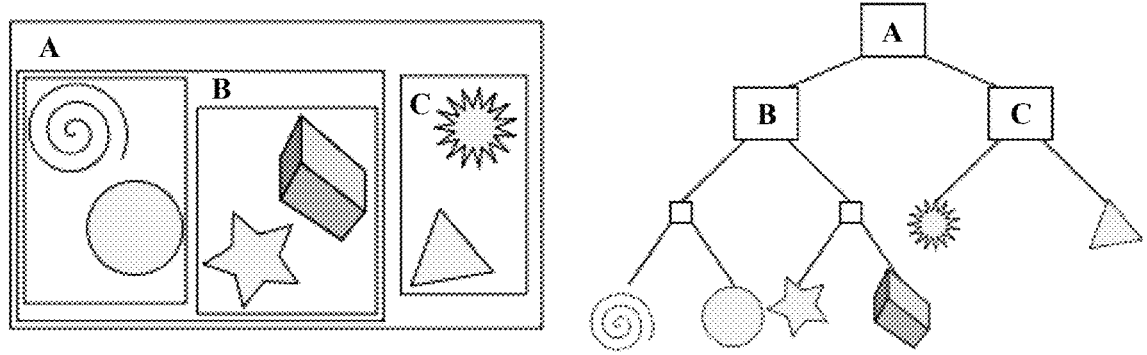
FIG. 5 is a schematic diagram of a BVH tree according to an embodiment of this application.

The CPU may further construct a BVH tree based on the spatial information of the reflected object, where the BVH tree may be used to implement a subsequent ray tracing operation. For example, the CPU may construct a BVH tree based on vertex coordinates, a vertex normal, and a triangle index of a reflected object. It may be understood that the BVH tree includes spatial information of a plurality of bounding volumes, the spatial information of each bounding volume includes coordinates of eight vertices of the bounding volume (cuboid) and vertical heights of the eight vertices, and each bounding volume is used to enclose at least one reflected object. For further understanding, the BVH tree is further described below with reference to FIG. 5. FIG. 5 is a schematic diagram of a BVH tree according to an embodiment of this application. As shown in FIG. 5, it is assumed that there are six reflected objects in a three-dimensional scene. Spatial information of a bounding volume A (enclosing the six objects) may be determined based on spatial information of the six objects. Spatial information of a bounding volume B (enclosing four objects) may be determined based on spatial information of the four objects. Spatial information of a bounding volume C (enclosing the remaining two objects) may be determined based on spatial information of the two objects. The spatial information of the bounding volume A, the spatial information of the bounding volume B, and the spatial information of the bounding volume C are managed in a binary tree structure, to obtain a BVH tree. It can be learned that the BVH tree may centrally manage spatial information of the bounding volume A, the bounding volume B, and the bounding volume C, that is, centrally manage the bounding volume A, the bounding volume B, and the bounding volume C. The bounding volume A is a maximum bounding volume in all bounding volumes.

When implementing ray tracing based on the BVH tree, a GPU of an electronic device needs to calculate whether a ray intersects with a reflected object in a three-dimensional scene (that is, an intersection calculation). Due to existence of the BVH tree, the GPU may determine, based on the BVH tree, a bounding volume enclosing the reflected object, and then determine whether the ray intersects with the bounding volume. If the ray does not contact the bounding volume, it indicates that the ray definitely does not intersect with the reflected object in the bounding volume. If the ray contacts the bounding volume, the GPU continue to calculate whether the ray intersects with the reflected object in the bounding volume. For example, when it is detected that the ray does not intersect with the bounding volume B in the binary tree, it indicates that the ray definitely does not intersect with the four reflected objects in the bounding volume B. Therefore, the operation of detecting whether the ray intersects with the four reflected objects in the bounding volume B may be omitted, only detecting whether the ray intersects with the two reflected objects in the bounding volume C.

In addition, the CPU may further obtain spatial information of a camera, and the camera is configured to shoot a target image that simulates the three-dimensional scene. The spatial information of the camera may include a vertical height of the camera and coordinates of the camera.

After obtaining the rendering information of the reflecting object, the rendering information of the reflected object, the BVH tree, and the spatial information of the camera, the CPU sends the information to a GPU, and the GPU performs image rendering based on the information.

402: Perform ray tracing based on the rendering information of the reflecting object, and store an obtained image of a reflection in the reflecting object in a first frame buffer, where the first frame buffer is used for storing an image that does not need to be displayed temporarily.

After obtaining the rendering information of the reflecting object (including the spatial information and the material information of the reflecting object), the rendering information of the reflected object (including the spatial information and the material information of the reflected object), the BVH tree, and the spatial information of the camera, the GPU may perform image rendering based on the information.

Figure 6:
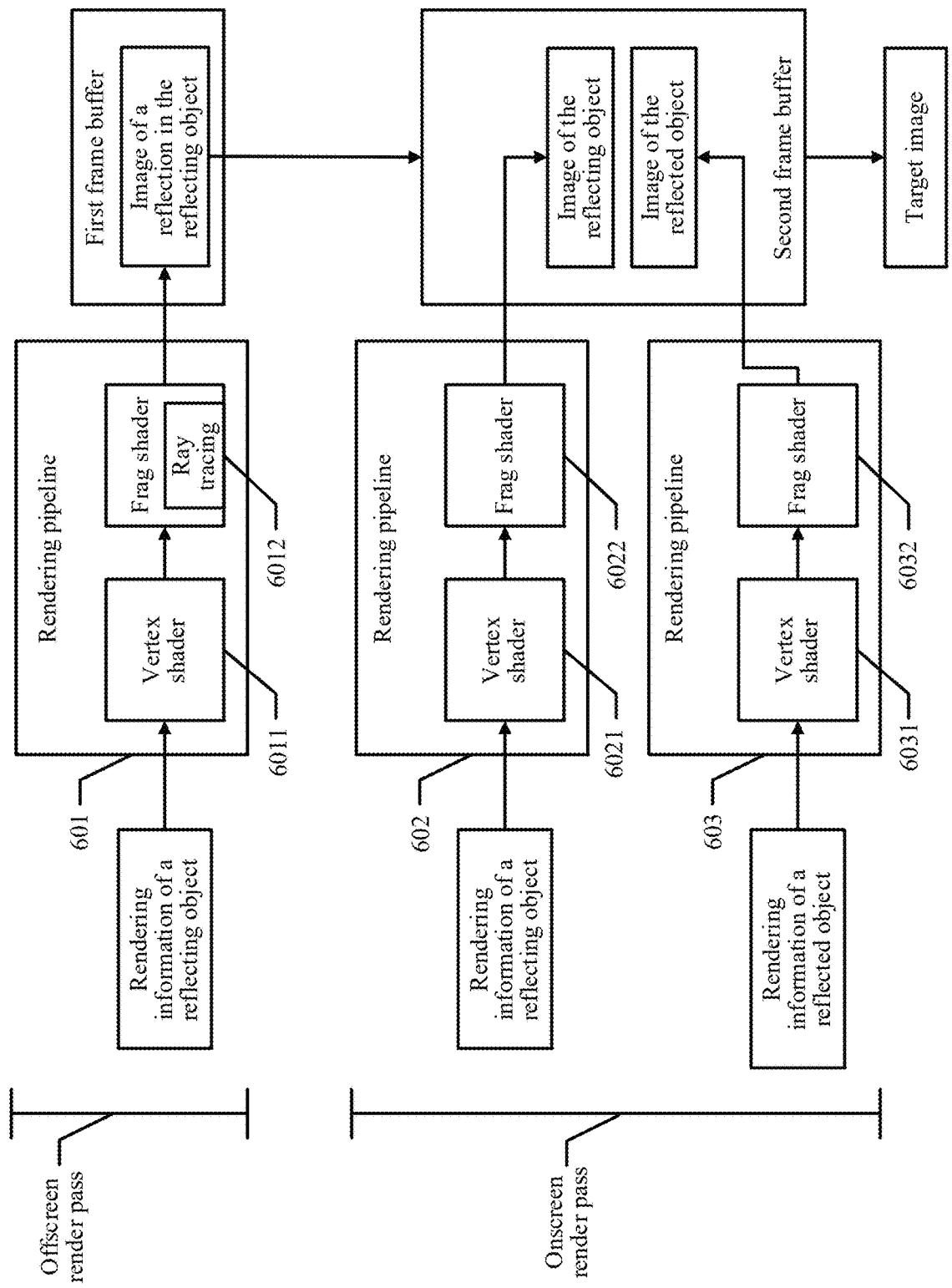
FIG. 6 is a schematic diagram of a first application scenario according to an embodiment of this application.

For ease of understanding, a process of image rendering is described below with reference to FIG. 6. FIG. 6 is a schematic diagram of a first application scenario according to an embodiment of this application. As shown in FIG. 6, the GPU provides a rendering pipeline 601 for an offscreen render pass, and the rendering pipeline 601 includes a vertex shader (VS) 6011 and a frag shader (FS) 6012. A ray tracing algorithm is set in the frag shader 6012. Therefore, the frag shader 6012 may be configured to perform the operation of ray tracing. The GPU may first input the rendering information of the reflecting object into the rendering pipeline 601, and the rendering pipeline 601 performs ray tracing based on the rendering information of the reflecting object, that is, performs ray tracing on the reflecting object, to obtain an image of a reflection in the reflecting object.

However, if ray tracing is performed on the entire reflecting object, that is, a ray is emitted to each vertex of the reflecting object, and then a route calculation and an intersection calculation are performed on each ray, the amount of which calculations is considerable. In addition, not all rays can intersect with the reflected object, and therefore, a calculation based on an invalid ray (that is, a ray that does not intersect with the reflected object) is an invalid calculation. It may be understood that the reflection in the reflecting object is actually a mapping image or a mirror image of the reflected object in the reflecting object. Therefore, a block area including the reflection in the reflecting object may be determined as a target area. If a ray is emitted to the target area in the reflecting object, the ray (a valid ray) intersects with the reflected object after passing through the area. If the ray hits an area other than the target area in the reflecting object, the ray does not intersect with the reflected object after passing through the area. It can be learned that if ray tracing is performed only on the target area, calculations of ray tracing can be effectively reduced, thereby reducing computing power of the GPU and reducing power consumption of image rendering.

It should be noted that the GPU may determine the target area in the reflecting object in the following manner:

The GPU may determine the spatial information of the maximum bounding volume from the BVH tree, and determine the spatial information of the target area in the reflecting object from the spatial information of the reflecting object based on the spatial information of the maximum bounding volume and the spatial information of the camera. If the spatial information of the target area in the reflecting object is obtained, it indicates that the target area in the reflecting object is determined. For example, it is assumed that any vertex in the maximum bounding volume is a first target point, and any vertex in the target area in the reflecting object is a second target point. In this case, there is a mathematical relationship between the vertical height (H1) of the camera, the vertical height (H2) of the first target point, the distance (X1) between the second target point and the camera, and the distance (X2) between the camera and the first target point: $H1/X1=H2/(X2-X1)$. It should be noted that X1 is the first distance, X2-X1 is the second distance, X2 is the third distance, X1 is determined based on coordinates of the camera and coordinates of the second target point, and X2 is determined based on the coordinates of the camera and coordinates of the first target point.

The coordinates of the camera, the vertical height of the camera, the coordinates of the first target point, and the vertical height of the first target point are all known values, while the coordinates of the second target point are unknown values. The rendering information of the reflecting object includes coordinates of each vertex of the reflecting object. Therefore, the GPU may determine whether the coordinates of each vertex of the reflecting object satisfy the mathematical relationship. If the coordinates of a vertex meet the mathematical relationship, the vertex is a vertex in the target area in the reflecting object. In this way, the reflecting object may be divided into a target area and other area than the target area. Correspondingly, the rendering information of the reflecting object may also be divided into rendering information of the target area and rendering information of the other area.

Figure 7:
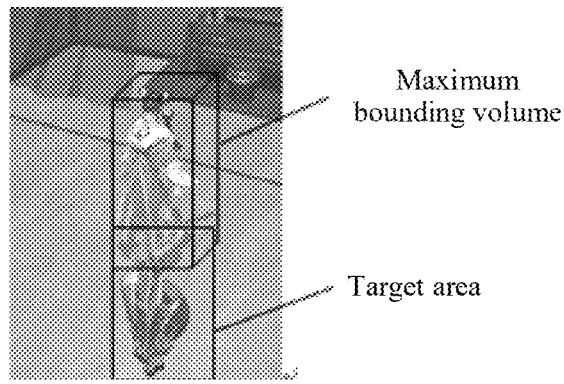
FIG. 7 is a schematic diagram of a target area according to an embodiment of this application.

A process of the determining the target area in the reflecting object is further described with reference to FIG. 7. FIG. 7 is a schematic diagram of a target area according to an embodiment of this application. As shown in FIG. 7, a three-dimensional scene is assumed, in which a person is standing on the ground with a reflection of the person on the ground. A maximum bounding volume in the scene may be first determined, and the maximum bounding volume is a bounding volume that encloses the person. Based on spatial information of the maximum bounding volume and the spatial information of the camera, a target area on the ground may be determined, and the target area includes the reflection of the person.

After obtaining rendering information of the target area in the reflecting object, the GPU may input spatial information of the target area in the reflecting object (for example, coordinates of a vertex of the reflecting object and a vertex normal of the reflecting object) into the vertex shader 6011, and the vertex shader 6011 may perform some calculation processing on the spatial information (for example, transform three-dimensional coordinates into two-dimensional coordinates), and input processed spatial information into the frag shader 6012. In addition, the GPU directly inputs the BVH tree and material information of the target area in the reflecting object into the frag shader 6012, and the frag shader 6012 may perform a ray tracing operation based on the processed spatial information, the BVH tree, and the material information of the target area in the reflecting object, to obtain an image of a reflection in the reflecting object, and store the image in a first frame buffer. In this case, the GPU successfully renders only the image of the reflection in the reflecting object, for example, an image of the reflection of the person in FIG. 7.

Still further, the GPU further sets resolution (a size of the resolution may be set based on an actual requirement) for the offscreen render pass. The resolution is generally less than screen resolution (for example, the size of the resolution may be 1/n of a size of the screen resolution). In this case, the rendering pipeline 601 renders an image of the target area in the reflecting object with the resolution. In a ray tracing process, the lower resolution of an image that needs to be rendered, the fewer vertices of a target area that need to be processed, and the fewer rays that need to be emitted. Therefore, calculations of ray tracing can be reduced, computing power of the GPU is reduced, and further, power consumption of image rendering is reduced.

403: Perform rasterization separately based on the rendering information of the reflecting object and the rendering information of the reflected object, and store an obtained image of the reflecting object and an obtained image of the reflected object in a second frame buffer, where the second frame buffer is used for storing an image to be displayed.

As shown in FIG. 6, the GPU provides two rendering pipelines for an onscreen render pass, which are a rendering pipeline 602 and a rendering pipeline 603. The rendering pipeline 602 includes a vertex shader 6021 and a frag shader 6022. The rendering pipeline 603 includes a vertex shader 6031 and a frag shader 6032. Both the frag shader 6022 and the frag shader 6032 are original frag shaders (i.e., no algorithm is set inside), so that both the frag shader 6022 and the frag shader 6032 may be configured to perform the operation of rasterization, where the frag shader 6022 is configured to perform rasterization of the reflecting object, and the frag shader 6032 is configured to perform rasterization of the reflected object.

Therefore, after the image of the reflection in the reflecting object is stored in the first frame buffer, the GPU may input the rendering information of the reflecting object into the rendering pipeline 602, and the rendering pipeline 602 performs rasterization based on the rendering information of the reflecting object, that is, performs rasterization on the reflecting object, to obtain an image of the reflecting object. For example, the GPU may input the spatial information of the reflecting object (for example, coordinates of a vertex of the reflecting object) into the vertex shader, and the vertex shader 6021 may perform calculation processing on the spatial information, and input processed spatial information into the frag shader 6022. In addition, the GPU directly inputs the material information of the reflecting object into the frag shader 6022, and the frag shader 6022 may perform a rasterization operation based on the processed spatial information and the material information of the reflecting object, to obtain the image of the reflecting object, and store the image in the second frame buffer.

The GPU may further input the rendering information of the reflected object into the rendering pipeline 603, and the rendering pipeline 603 performs rasterization based on the rendering information of the reflected object, that is, performs rasterization on the reflected object, to obtain an image of the reflected object. For example, the GPU may input the spatial information of the reflected object (for example, coordinates of a vertex of the reflected object) into the vertex shader, and the vertex shader 6031 may perform calculation processing on the spatial information, and input processed spatial information into the frag shader 6032. In addition, the GPU directly inputs the material information of the reflected object into the frag shader 6032, and the frag shader 6032 may perform a rasterization operation based on the processed spatial information and the material information of the reflected object, to obtain the image of the reflected object, and store the image in the second frame buffer. In this case, the GPU successfully renders the image of the reflecting object and the image of the reflected object, for example, the image of the ground and the image of the person in FIG. 7.

It should be understood that a process of rendering the image of the reflecting object and a process of rendering the image of the reflected object may be parallel.

404: Obtain the image of the reflection in the reflecting object from the first frame buffer, and store the image of the reflection in the reflecting object in the second frame buffer, so that the image of the reflecting object, the image of the reflected object, and the image of the reflection in the reflecting object are fused to obtain a target image.

Because the second frame buffer stores an image to be displayed on a screen (that is, an image sent for display), when the GPU stores the image of the reflecting object in the second frame buffer, the GPU needs to immediately obtain the image of the reflection in the reflecting object from the first frame buffer, and store the image of the reflection in the reflecting object in the second frame buffer. In this way, the image of the reflecting object, the image of the reflected object, and the image of the reflection in the reflecting object may be fused in the second frame buffer, to obtain the target image sent for display. For example, the target image may present the three-dimensional scene shown in FIG. 7, in which a person is standing on the ground with a reflection of the person on the ground. Next, the CPU may obtain the target image from the second frame buffer, and send the target image to the screen for display for viewing by the user.

It should be noted that the GPU also sets resolution for the onscreen render pass, and the resolution is the screen resolution. Therefore, resolution of the image of the reflecting object and resolution of the image of the reflected object are screen resolution. In this case, the resolution of the image of the reflecting object and the resolution of the image of the reflected object are greater than resolution of the image of the reflection in the reflecting object. In this case, in the target image, the image of the reflecting object and the image of the reflected object appear clear, and the image of the reflection in the reflecting object appears blurry.

In an embodiment, after a GPU obtains rendering information of a reflecting object and rendering information of a reflected object, the GPU may first perform ray tracing based on the rendering information of the reflecting object, and store an obtained image of a reflection in the reflecting object in a first frame buffer. Then, the GPU performs rasterization separately based on the rendering information of the reflecting object and the rendering information of the reflected object. When storing an obtained image of the reflecting object and an obtained image of the reflected object in a second frame buffer, the GPU needs to extract an image of a reflection in the reflecting object from the first frame buffer, and store it in the second frame buffer. In this way, the image of the reflecting object, the image of the reflected object, and the image of the reflection in the reflecting object may be fused in the second frame buffer, to obtain a target image sent for display. In the foregoing process, before obtaining the target image sent for display, the GPU only needs to complete transmission of the image of the reflection in the reflecting object (that is, store the image of the reflection in the reflecting object in the first frame buffer, and extract the image of the reflection in the reflecting object from the first frame buffer). The image of the reflection in the reflecting object is only a part of a shadow or mirror of the reflected object, that is, the image of the reflection in the reflecting object includes few information. Therefore, I/O overheads generated during transmitting the image of the reflection in the reflecting object are low, and power consumption of image rendering can be reduced.

Figure 8:
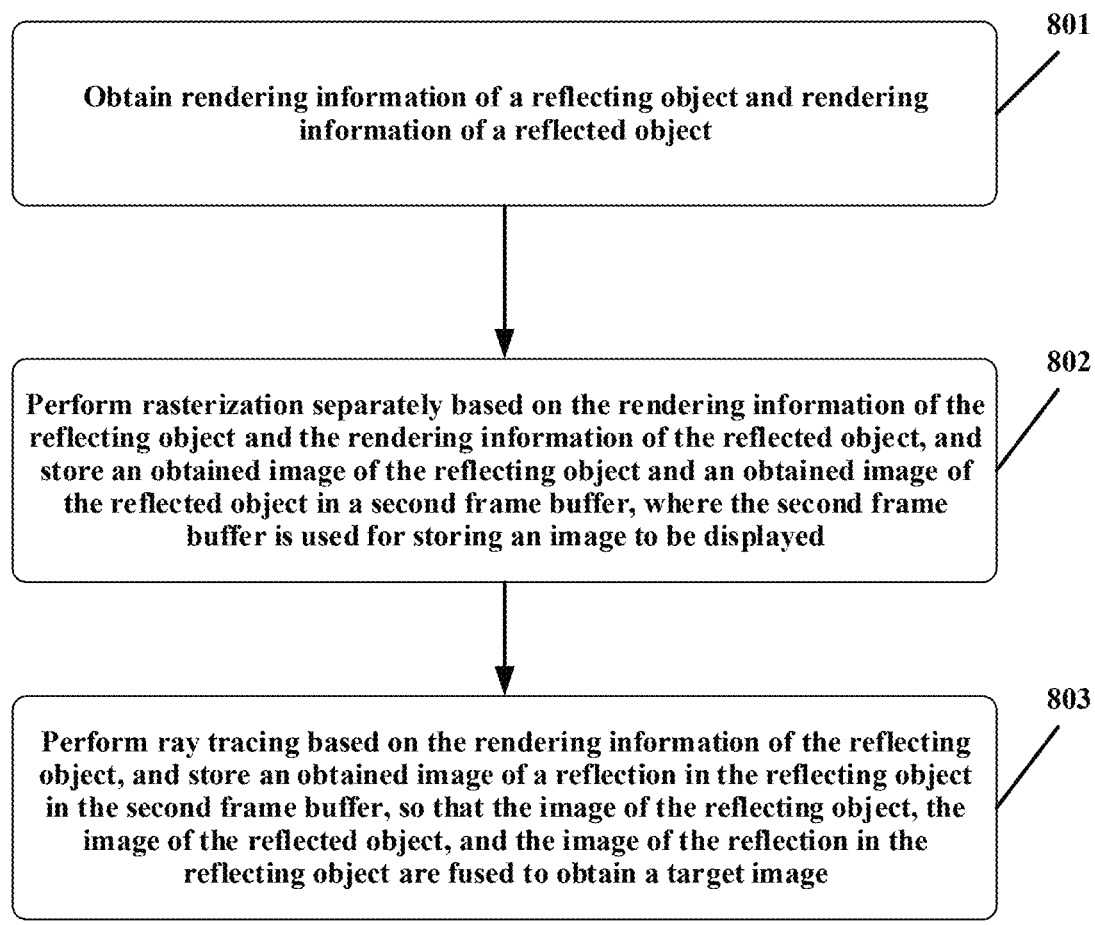
FIG. 8 is another schematic flowchart of an image rendering method according to an embodiment of this application.

The first application scenario is described in detail above, and the second application scenario is described below. FIG. 8 is another schematic flowchart of an image rendering method according to an embodiment of this application. As shown in FIG. 8, the method includes the following operations.

801: Obtain rendering information of a reflecting object and rendering information of a reflected object.

For description of operation 801, refer to related description of operation 401 in the embodiment shown in FIG. 4. Details are not described herein again.

802: Perform rasterization separately based on the rendering information of the reflecting object and the rendering information of the reflected object, and store an obtained image of the reflecting object and an obtained image of the reflected object in a second frame buffer, where the second frame buffer is used for storing an image to be displayed.

Figure 9:
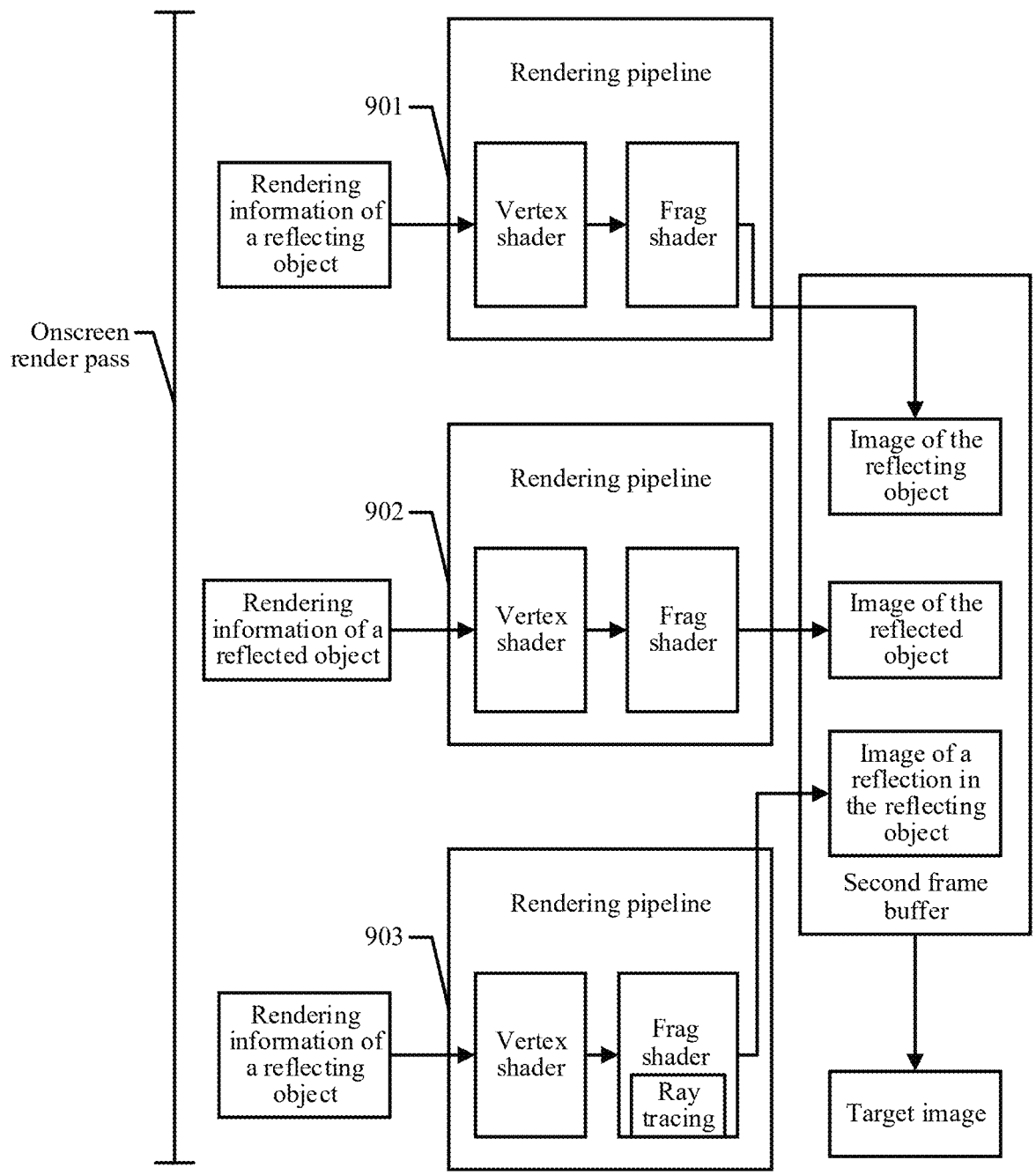
FIG. 9 is a schematic diagram of a second application scenario according to an embodiment of this application.

In an embodiment, a GPU may complete rasterization through an onscreen render pass. As shown in FIG. 9 (FIG. 9 is a schematic diagram of a second application scenario according to an embodiment of this application), the GPU provides a rendering pipeline 901 and a rendering pipeline 902 for an onscreen render pass. The rendering pipeline 901 is configured to rasterize a reflecting object, and the rendering pipeline 902 is configured to rasterize a reflected object. For example, for description of a process of the rasterization in operation 802, refer to related description of operation 403 in the embodiment shown in FIG. 4. Details are not described herein again.

803: Perform ray tracing based on the rendering information of the reflecting object, and store an obtained image of a reflection in the reflecting object in the second frame buffer, so that the image of the reflecting object, the image of the reflected object, and the image of the reflection in the reflecting object are fused to obtain a target image.

In an embodiment, a GPU may complete ray tracing through an onscreen render pass. As shown in FIG. 9, the GPU further provides a third rendering pipeline 903 for the onscreen render pass, and the rendering pipeline 903 is configured to perform ray tracing on a reflecting object. For description of a process of the ray tracing in operation 803, refer to related description of operation 402 in the embodiment shown in FIG. 4. Details are not described herein again.

It should be noted that a difference between operation 803 and operation 402 lies in that: in operation 803, after the ray tracing of the reflecting object is completed, the obtained image of the reflection in the reflecting object is stored in the second frame buffer. Therefore, the image of the reflecting object, the image of the reflected object, and the image of the reflection in the reflecting object may be fused in the second frame buffer, to obtain the target image.

It should be understood that a process of rendering the image of the reflecting object, a process of rendering the image of the reflected object, and a process of rendering the image of the reflection in the reflecting object may be parallel. In other words, the GPU may synchronously perform operation 802 and operation 803.

In an embodiment, after a GPU obtains rendering information of a reflecting object and rendering information of a reflected object, the GPU performs rasterization based on the rendering information of the reflecting object and the rendering information of the reflected object, and stores an obtained image of the reflecting object and an obtained image of the reflected object in a second frame buffer. In addition, the GPU may further perform ray tracing based on the rendering information of the reflecting object, and store an obtained image of a reflection in the reflecting object in the second frame buffer. In this way, the image of the reflecting object, the image of the reflected object, and the image of the reflection in the reflecting object may be fused in the second frame buffer, to obtain a target image sent for display. In the foregoing process, before obtaining the target image sent for display, the GPU does not need to store an image in a first frame buffer (used for storing an image that does not need to be displayed on a screen temporarily) or extract an image from the first frame buffer, so that I/O overheads can be effectively reduced, to reduce power consumption of image rendering.

Figure 10:
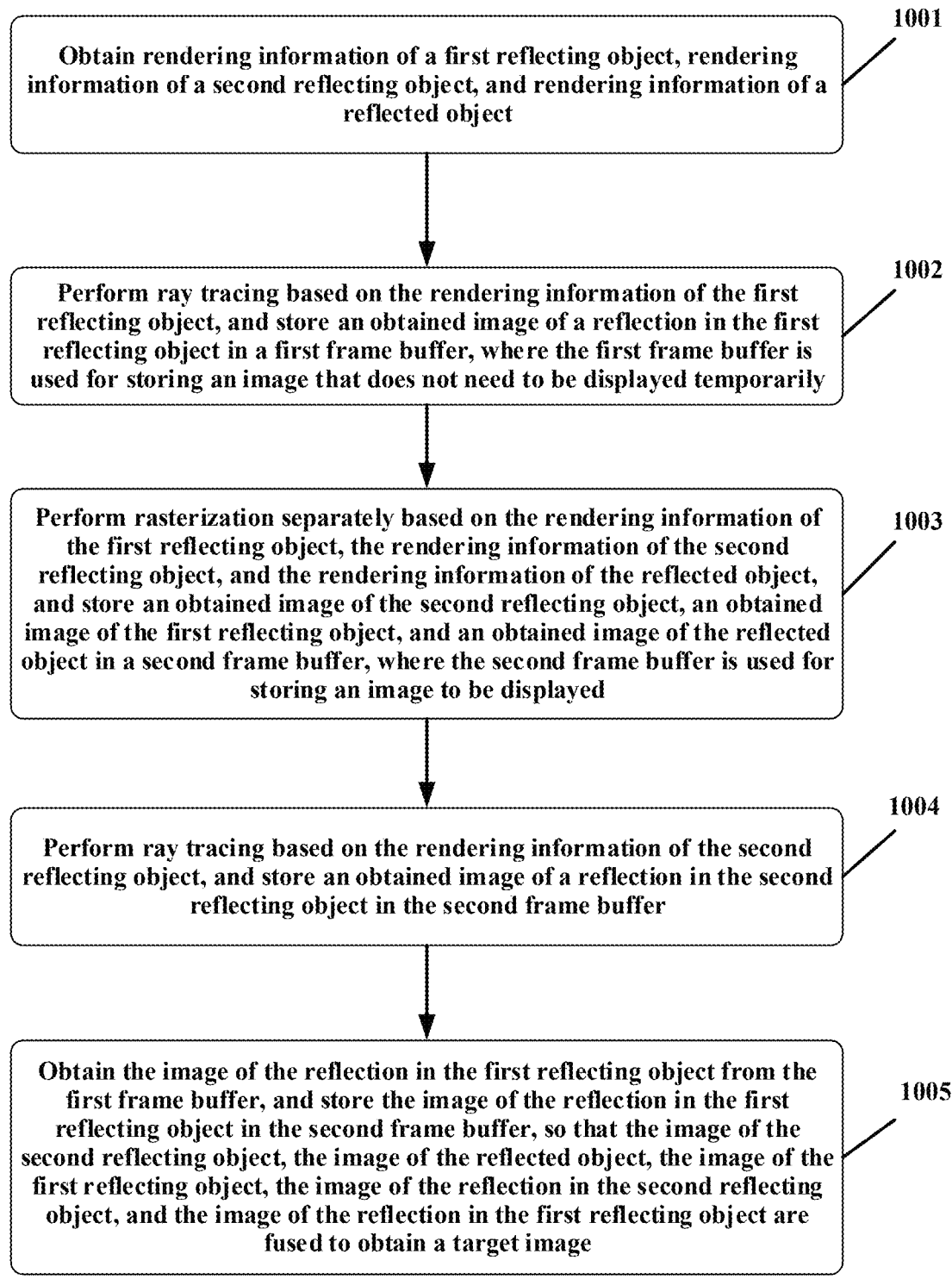
FIG. 10 is still another schematic flowchart of an image rendering method according to an embodiment of this application.

The second application scenario is described in detail above, and the third application scenario is described below. FIG. 10 is still another schematic flowchart of an image rendering method according to an embodiment of this application. As shown in FIG. 10, the method includes the following operations.

1001: Obtain rendering information of a first reflecting object, rendering information of a second reflecting object, and rendering information of a reflected object.

In an embodiment, after obtaining a model file of a three-dimensional scene, a CPU may parse out rendering information of objects in the three-dimensional scene from the model file. The rendering information of each object includes spatial information of the object and material information of the object. The spatial information of the object includes information such as vertex coordinates of the object, a normal of vertex of the object, and a triangle index. The material information of the object includes information such as a color of the object, metalness of the object, and roughness of the object.

After obtaining the material information of the object, the CPU may determine a category of the object based on metalness and roughness of the object. For example, if determining that metalness of an object is less than a preset first threshold, the CPU may determine that the object is a reflected object, for example, a person or a table. If determining that metalness of an object is greater than or equal to the preset first threshold, the CPU may determine that the object is a reflecting object, where the reflecting object includes a first reflecting object and a second reflecting object, a reflection type of the first reflecting object is diffuse reflection, for example, ground or glass, and a reflection type of the second reflecting object is specular reflection, for example, a mirror or a lake. Still further, if determining that metalness of an object is greater than or equal to the preset first threshold and less than a preset second threshold, and that roughness of the object is greater than or equal to a preset third threshold, the CPU determines that the object is the first reflecting object. If determining that metalness of an object is greater than or equal to the preset second threshold, and roughness of the object is less than the preset third threshold, the CPU determines that the object is the second reflecting object.

The CPU may further construct a BVH tree based on the rendering information of the reflected object, and obtain spatial information of a camera. For this process, refer to related description of operation 401 in the embodiment shown in FIG. 4. Details are not described herein again.

After obtaining the rendering information of the first reflecting object, the rendering information of the second reflecting object, the rendering information of the reflected object, the BVH tree, and the spatial information of the camera, the CPU sends the information to a GPU, and the GPU performs image rendering based on the information.

1002: Perform ray tracing based on the rendering information of the first reflecting object, and store an obtained image of a reflection in the first reflecting object in a first frame buffer, where the first frame buffer is used for storing an image that does not need to be displayed temporarily.

Figure 11:
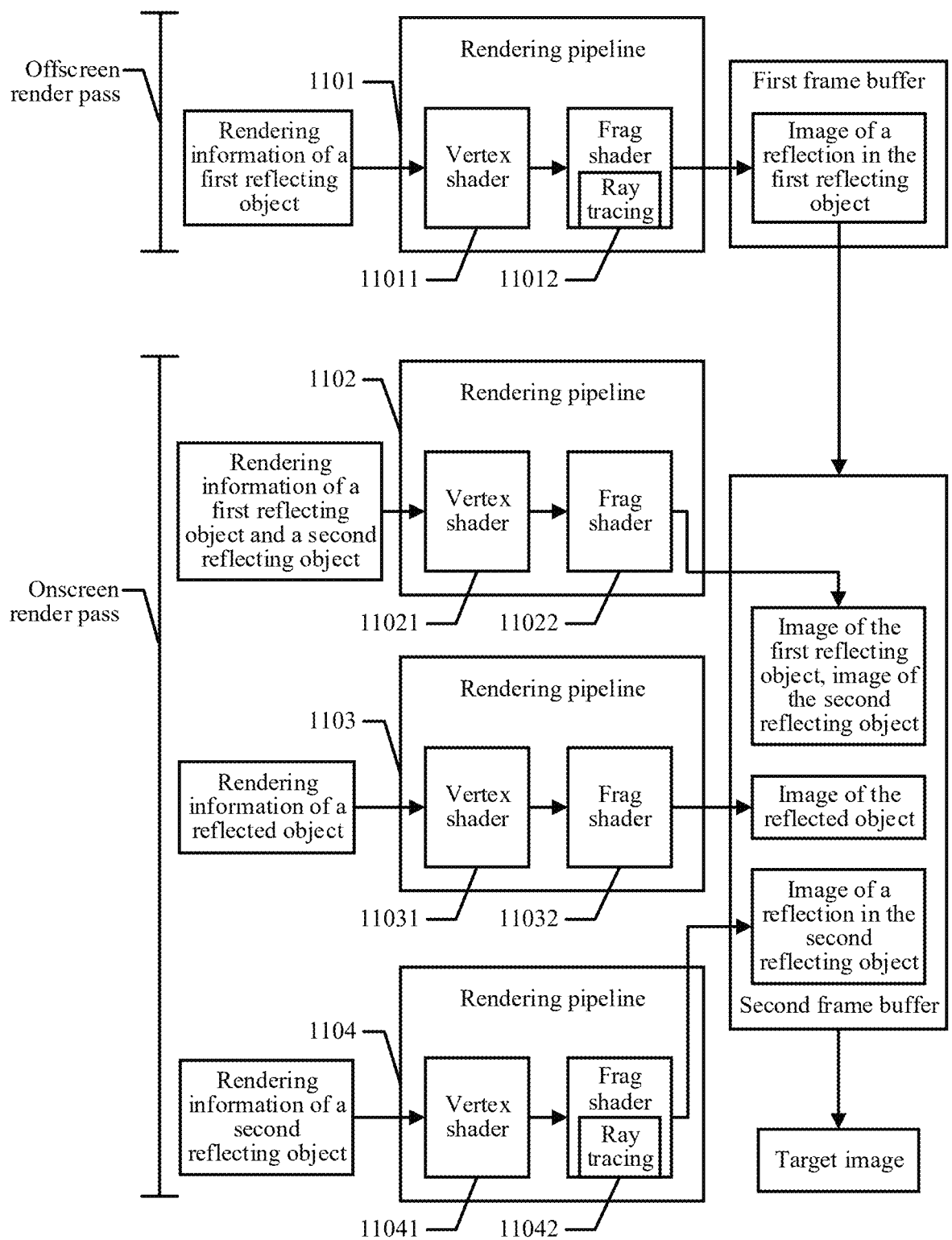
FIG. 11 is a schematic diagram of a third application scenario according to an embodiment of this application.

After obtaining the rendering information of the first reflecting object, the rendering information of the second reflecting object, the rendering information of the reflected object, the BVH tree, and the spatial information of the camera, the GPU may perform image rendering based on the information. For ease of understanding, a process of image rendering is described below with reference to FIG. 11. FIG. 11 is a schematic diagram of a third application scenario according to an embodiment of this application. As shown in FIG. 11, the GPU provides a rendering pipeline 1101 for an offscreen render pass, and the rendering pipeline 1101 includes a vertex shader 11011 and a frag shader 11012. A ray tracing algorithm is set in the frag shader 11012. Therefore, the frag shader 11012 may be configured to perform ray tracing of the first reflecting object.

The GPU may first determine rendering information of a target area in the reflecting object from the rendering information of the first reflecting object, and perform ray tracing based on the rendering information of the target area in the reflecting object, to obtain an image of a reflection in the first reflecting object. For example, the GPU may determine spatial information of a maximum bounding volume from the BVH tree. Next, the GPU determines the rendering information of the target area in the first reflecting object from the rendering information of the first reflecting object based on the spatial information of the maximum bounding volume and the spatial information of the camera. Finally, the GPU inputs the rendering information of the target area in the first reflecting object into the rendering pipeline 1101, and the rendering pipeline 1101 performs ray tracing based on the rendering information of the target area in the first reflecting object, that is, performs ray tracing on the target area in the first reflecting object, to obtain the image of the reflection in the first reflecting object, and stores the image in the first frame buffer. A third target point in the target area in the first reflecting object satisfies the following condition:

a ratio of the vertical height of the camera to a fourth distance is equal to a ratio of the vertical height of the first target point to a fifth distance, the first target point is any vertex in the maximum bounding volume, the third target point is any vertex in the target area in the first reflecting object, the fourth distance is a distance between the third target point and the camera, the fourth distance is determined based on coordinates of the third target point and the coordinates of the camera, the fifth distance is a difference between the fourth distance and a third distance; the third distance is a distance between the first target point and the camera, and the third distance is determined based on the coordinates of the camera and the coordinates of the first target point.

Further, the GPU further sets resolution (a size of the resolution may be set based on an actual requirement) for the offscreen render pass. The resolution is generally less than screen resolution.

It should be noted that for a process in which the GPU determines the target area in the first reflecting object and a process in which the GPU performs ray tracing through the rendering pipeline 1101, refer to related description of operation 402 in the embodiment shown in FIG. 4. Details are not described herein again.

1003: Perform rasterization separately based on the rendering information of the first reflecting object, the rendering information of the second reflecting object, and the rendering information of the reflected object, and store an obtained image of the second reflecting object, an obtained image of the first reflecting object, and an obtained image of the reflected object in a second frame buffer, where the second frame buffer is used for storing an image to be displayed.

1004: Perform ray tracing based on the rendering information of the second reflecting object, and store an obtained image of a reflection in the second reflecting object in the second frame buffer.

As shown in FIG. 11, the GPU may provide three rendering pipelines for an onscreen render pass, which are a rendering pipeline 1102, a rendering pipeline 1103, and a rendering pipeline 1104. The rendering pipeline 1102 includes a vertex shader 11021 and a frag shader 11022. The rendering pipeline 1103 includes a vertex shader 11031 and a frag shader 11032. The rendering pipeline 1104 includes a vertex shader 11041 and a frag shader 11042. The frag shader 11022 and the frag shader 11032 are both original frag shaders (that is, no algorithm is set inside), and the frag shader 11042 is set with a ray tracing algorithm. Therefore, both the frag shader 11022 and the frag shader 11032 may be configured to perform the operation of rasterization, and the frag shader 11042 may be configured to perform the operation of ray tracing. The frag shader 11022 is configured to perform rasterization of a reflecting object (including a first reflecting object and a second reflecting object). The frag shader 11032 is configured to perform rasterization of a reflected object. The frag shader 11042 is configured to perform ray tracing of the second reflecting object.

After the image of the reflection in the first reflecting object is stored in the first frame buffer, the GPU may input the rendering information of the first reflecting object and the rendering information of the second reflecting object into the rendering pipeline 1102, and input the rendering information of the reflected object into the rendering pipeline 1103. In this way, the rendering pipeline 1102 may perform rasterization based on the rendering information of the first reflecting object and the second reflecting object (that is, perform rasterization on the first reflecting object and the second reflecting object), to obtain an image of the first reflecting object and an image of the second reflecting object. The rendering pipeline 1103 may perform rasterization based on the rendering information of the reflected object (that is, perform rasterization on the reflected object), to obtain an image of the reflected object. After obtaining the image of the first reflecting object, the image of the second reflecting object and the image of the reflected object, the GPU may store these images in a second frame buffer.

In addition, the GPU may further determine rendering information of a target area in the second reflecting object from the rendering information of the second reflecting object, and perform ray tracing based on the rendering information of the target area in the second reflecting object, to obtain an image of a reflection in the second reflecting object. For example, the GPU may determine spatial information of a maximum bounding volume from the BVH tree. Next, the GPU determines the rendering information of the target area in the second reflecting object from the rendering information of the second reflecting object based on the spatial information of the maximum bounding volume and the spatial information of the camera. Finally, the GPU inputs the rendering information of the target area in the second reflecting object into the rendering pipeline 1104, and the rendering pipeline 1104 performs ray tracing based on the rendering information of the target area in the second reflecting object, that is, performs ray tracing on the target area in the second reflecting object, to obtain the image of the reflection in the second reflecting object, and stores the image in the second frame buffer. A second target point in the target area in the second reflecting object satisfies the following condition:

a ratio of the vertical height of the camera to a first distance is equal to a ratio of the vertical height of the first target point to a second distance, the first target point is any vertex in the maximum bounding volume, the second target point is any vertex in the target area in the second reflecting object, the first distance is a distance between the second target point and the camera, the first distance is determined based on coordinates of the second target point and the coordinates of the camera, the second distance is a difference between the first distance and a third distance; the third distance is a distance between the first target point and the camera, and the third distance is determined based on the coordinates of the camera and the coordinates of the first target point.

It should be noted that for a process in which the GPU performs rasterization through the rendering pipelines 1102 and 1103, refer to related description of operation 403 in the embodiment shown in FIG. 4. Details are not described herein again. Similarly, for a process in which the GPU determines the target area in the second reflecting object and a process in which the GPU performs ray tracing through the rendering pipeline 1104, refer to related description of operation 402 in the embodiment shown in FIG. 4. Details are not described herein again.

It should be understood that a process of rendering the image of the first reflecting object, a process of rendering the image of the second reflecting object, a process of rendering the image of the reflected object, and a process of rendering the image of the reflection in the second reflecting object may be parallel. In other words, the GPU may synchronously perform operation 1003 and operation 1004.

1005: Obtain the image of the reflection in the first reflecting object from the first frame buffer, and store the image of the reflection in the first reflecting object in the second frame buffer, so that the image of the second reflecting object, the image of the reflected object, the image of the first reflecting object, the image of the reflection in the second reflecting object, and the image of the reflection in the first reflecting object are fused to obtain a target image.

Because the second frame buffer stores an image to be displayed on a screen (that is, an image sent for display), when the GPU stores the image of the first reflecting object in the second frame buffer, the GPU needs to immediately obtain the image of the reflection in the first reflecting object from the first frame buffer, and store the image of the reflection in the first reflecting object in the second frame buffer. In this way, the image of the second reflecting object, the image of the reflected object, the image of the first reflecting object, the image of the reflection in the second reflecting object, and the image of the reflection in the first reflecting object may be fused in the second frame buffer, to obtain a target image sent for display. Next, the CPU may obtain the target image from the second frame buffer, and send the target image to the screen for display for viewing by the user.

It should be noted that the GPU also sets resolution for the onscreen render pass, and the resolution is the screen resolution. Therefore, resolution of the image of the first reflecting object, resolution of the image of the second reflecting object, resolution of the image of the reflected object, and resolution of the image of the reflection in the second reflecting object are screen resolution. Therefore, the resolution of the image of the first reflecting object is greater than resolution of the image of the reflection in the first reflecting object. In this case, in the target image, the image of the first reflecting object, the image of the second reflecting object, the image of the reflected object, and the image of the reflection in the second reflecting object appear clear, and the image of the reflection in the first reflecting object appears blurry.

In an embodiment, the GPU may simultaneously obtain the rendering information of the second reflecting object, the rendering information of the reflected object, and the rendering information of the first reflecting object. Generally, a reflection type of the first reflecting object is diffuse reflection, and a reflection type of the second reflecting object is specular reflection. For example, the first reflecting object is ground, and the second reflecting object is a mirror. Next, the GPU may first perform ray tracing based on the rendering information of the first reflecting object, and store the obtained image of the reflection in the first reflecting object in the first frame buffer. Next, the GPU performs rasterization separately based on the rendering information of the second reflecting object, the rendering information of the first reflecting object, and the rendering information of the reflected object, and performs ray tracing based on the rendering information of the second reflecting object. After obtaining, to store the image of the second reflecting object, the image of the first reflecting object, the image of the reflected object, and the image of the reflection in the second reflecting object in the second frame buffer, the GPU needs to extract the image of the reflection in the first reflecting object from the first frame buffer, and store it in the second frame buffer. In this way, the image of the second reflecting object, the image of the first reflecting object, the image of the reflected object, the image of the reflection in the second reflecting object, and the image of the reflection in the first reflecting object may be fused in the second frame buffer, to obtain a target image sent for display. For example, the target image includes an image of ground, an image of a mirror, an image of a person, an image of a human shadow on the ground, and an image of the person in the mirror. Therefore, the target image may present a picture in which the person stands on the ground and looks in the mirror.

In the foregoing process, before obtaining the target image sent for display, the GPU only needs to complete transmission of the image of the reflection in the first reflecting object (that is, store the image of the reflection in the first reflecting object in the first frame buffer, and extract the image of the reflection in the first reflecting object from the first frame buffer). The image of the reflection in the first reflecting object is only a part of a shadow of the reflected object, that is, the image of the reflection in the reflecting object includes few information. Therefore, I/O overheads generated during transmitting the image of the reflection in the first reflecting object are low, and power consumption of image rendering can be reduced.

Figure 12:
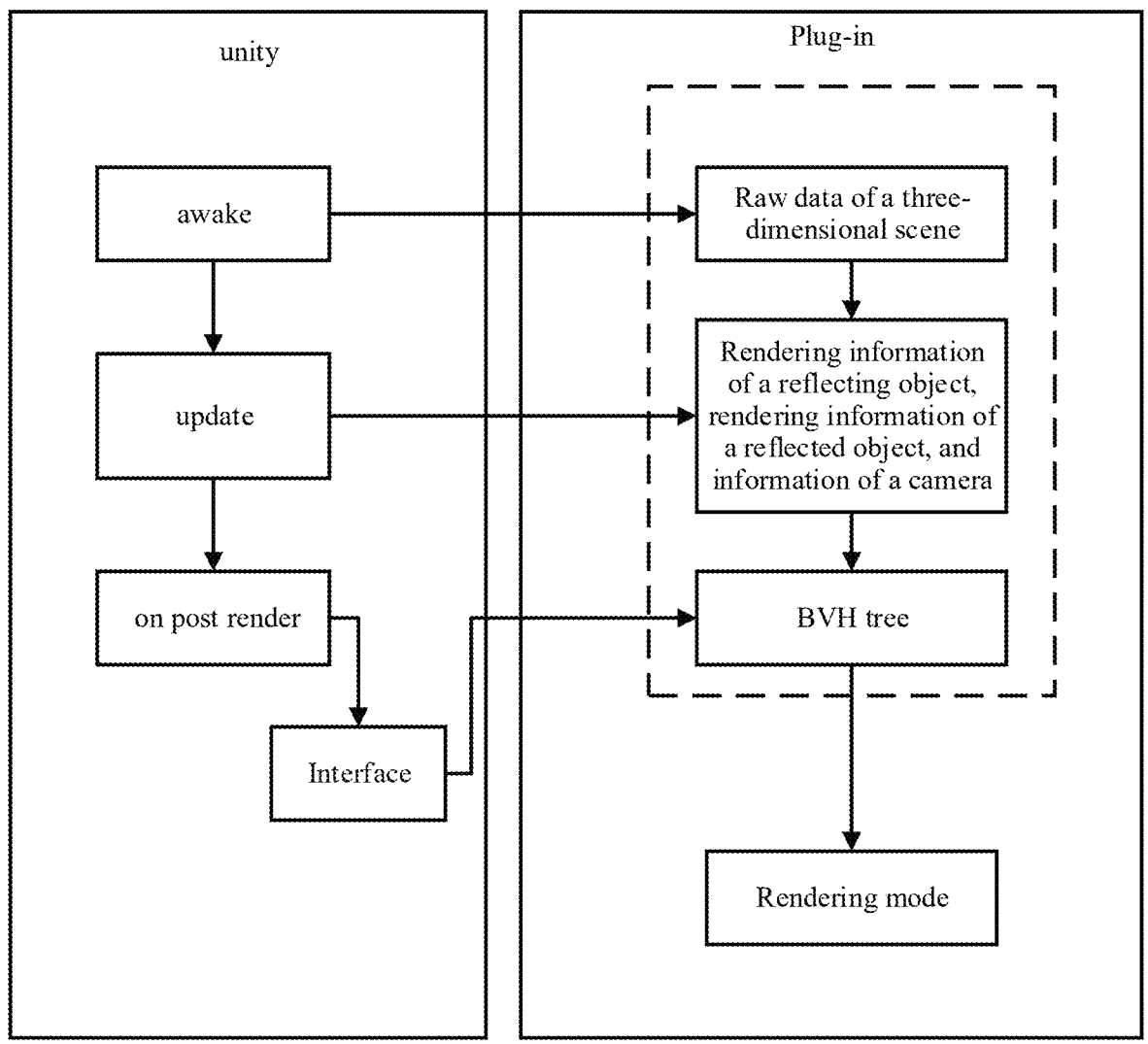
FIG. 12 is a schematic diagram of an application embodiment of an image rendering method according to an embodiment of this application.

The following further describes the image rendering method provided in embodiments of this application with reference to an application embodiment. FIG. 12 is a schematic diagram of an application embodiment of an image rendering method according to an embodiment of this application. As shown in FIG. 12, in this application embodiment, an additional plug-in that can be implemented may be added to a Unity program, and the plug-in is configured to implement the methods shown in FIG. 4, FIG. 8, and FIG. 10, that is, to implement three rendering modes. A rendering mode to be implemented by the plug-in may be set by plugging in based on an actual requirement. This is not specifically limited herein.

For example, when the program is in an initialization (awake) phase, raw data of a three-dimensional scene may be transferred to the plug-in. When the program is in an update phase of an image frame, information such as rendering information of a reflecting object, rendering information of a reflected object, and spatial information of a camera that corresponds to the image frame may be updated based on the raw data, a BVH tree is constructed based on the rendering information of the reflected object, and then the plug-in updates the information. When the program is in a rendering (on post render) phase, the plug-in is invoked via the plug-in interface. The plug-in transfers the information to the GPU, and the GPU uses a rendering mode provided by the plug-in to complete rendering and obtain a final target image sent for display.

It should be understood that in FIG. 12, the rendering mode (including the offscreen render pass and the onscreen render pass) shown in FIG. 4 is merely used as an example for description, and does not constitute a limitation on the rendering mode in this application embodiment.

In addition, in this application, an electronic device is further enabled to perform a test in different rendering modes, and a better mode is obtained based on a test result. A first mode is rasterization with no ray tracing performed, a second mode is delayed rendering (that is, a rendering mode mentioned in the background), a third mode is a rendering mode shown in FIG. 8, and a fourth mode is a rendering mode shown in FIG. 10. Table 1 shows test results of the four rendering modes.

In Table 1, the difference 1 is a difference between the average value of the first mode and the average value of the second mode, the difference 2 is a difference between the average value of the first mode and the average value of the third mode, and the difference 3 is a difference between the average value of the first mode and the average value of the fourth mode. It can be learned from the test results shown in Table 1 that, compared with an existing rendering mode (the first two rendering modes), power consumption of the rendering mode (the last two rendering modes) provided in this application is relatively low, and power consumption of the last rendering mode is lower than that of the third rendering mode.

Figure 13:
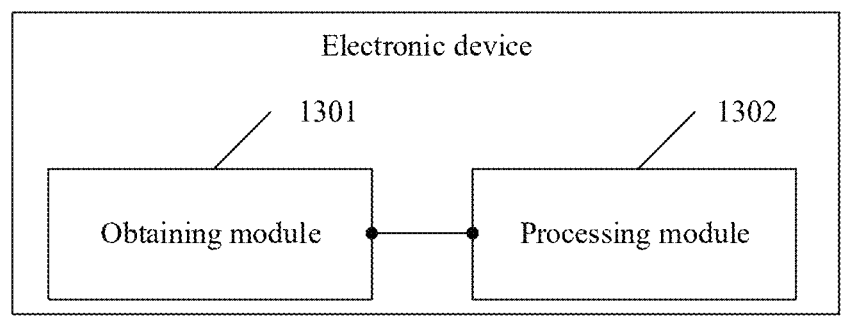
FIG. 13 is another schematic structural diagram of an electronic device according to an embodiment of this application.

The image rendering method provided in embodiments of this application is described in detail above, and an electronic device provided in embodiments of this application is described below. FIG. 13 is another schematic structural diagram of an electronic device according to an embodiment of this application. As shown in FIG. 13, the electronic device includes an obtaining module 1301 and a processing module 1302.

The obtaining module 1301 is configured to obtain rendering information of a reflecting object and rendering information of a reflected object.

The processing module 1302 is configured to perform ray tracing based on the rendering information of the reflecting object, and store an obtained image of a reflection in the reflecting object in a first frame buffer, where the first frame buffer is used for storing an image that does not need to be displayed temporarily.

The processing module 1302 is further configured to perform rasterization separately based on the rendering information of the reflecting object and the rendering information of the reflected object, and store an obtained image of the reflecting object and an obtained image of the reflected object in a second frame buffer, where the second frame buffer is used for storing an image to be displayed.

The processing module 1302 is further configured to obtain the image of the reflection in the reflecting object from the first frame buffer, and store the image of the reflection in the reflecting object in the second frame buffer, so that the image of the reflecting object, the image of the reflected object, and the image of the reflection in the reflecting object are fused to obtain a target image.

In an embodiment, the processing module 1302 is configured to: determine rendering information of a target area

TABLE 1

| Scenario | Normalized current (mA) | Average FPS (FPS) | CPU1 load | CPU2 load | CPU3 load | GPU load | Load of double data rate synchronous memory |
|---|---|---|---|---|---|---|---|
| First mode (average value) | 537.5 | 60.18 | 583.27 | 965.44 | 1536.00 | 282.42 | 644.17 |
| Second mode (average value) | 848.86 | 58.58 | 595.04 | 835.14 | 1540.61 | 541.59 | 1023.99 |
| Difference 1 | 311.35 | −1.60 | 11.77 | −130.30 | 4.61 | 259.17 | 379.82 |
| Third mode (average value) | 665.98 | 60.17 | 613.58 | 841.33 | 1540.96 | 443.74 | 760.23 |
| Difference 2 | 128.47 | −0.01 | 30.31 | −124.11 | 4.96 | 161.32 | 116.06 |
| Fourth mode (average value) | 601.78 | 60.17 | 587.8 | 841.87 | 1553.87 | 357.13 | 767.83 |
| Difference 3 | 64.27 | −0.01 | 4.53 | −123.57 | 17.87 | 74.71 | 123.66 | in the reflecting object from the rendering information of the reflecting object, where the target area in the reflecting object includes the reflection in the reflecting object; and perform the ray tracing based on the rendering information of the target area in the reflecting object.

In an embodiment, the processing module 1302 is configured to: obtain a bounding volume hierarchy BVH tree and spatial information of a camera, where the BVH tree is constructed based on the rendering information of the reflected object, and the camera is configured to shoot the target image; determine spatial information of a maximum bounding volume from the BVH tree; and determine, based on the spatial information of the maximum bounding volume and the spatial information of the camera, the rendering information of the target area in the reflecting object from the rendering information of the reflecting object.

In an embodiment, the spatial information of the maximum bounding volume includes a vertical height of a first target point and coordinates of the first target point. The spatial information of the camera includes a vertical height of the camera and coordinates of the camera. The rendering information of the target area in the reflecting object includes coordinates of a second target point, and the second target point satisfies the following conditions: a ratio of the vertical height of the camera to a first distance is equal to a ratio of the vertical height of the first target point to a second distance, the first target point is any vertex in the maximum bounding volume, the second target point is any vertex in the target area in the reflecting object, the first distance is a distance between the second target point and the camera, the first distance is determined based on the coordinates of the second target point and the coordinates of the camera, the second distance is a difference between the first distance and a third distance, and the third distance is determined based on the coordinates of the camera and the coordinates of the first target point.

In an embodiment, the rendering information of the reflecting object includes metalness of the reflecting object. The rendering information of the reflected object includes metalness of the reflected object. The metalness of the reflecting object is greater than or equal to a preset threshold. The metalness of the reflected object is less than the preset threshold.

In an embodiment, resolution of the image of the reflecting object is the same as resolution of the image of the reflected object, and resolution of the image of the reflection in the reflecting object is less than the resolution of the image of the reflecting object.

In an embodiment, the rendering information of the reflecting object further includes coordinates of a vertex of the reflecting object, a vertex normal of the reflecting object, a triangle index of the reflecting object, roughness of the reflecting object, and a color of the reflecting object. The rendering information of the reflected object further includes coordinates of a vertex of the reflected object, a vertex normal of the reflected object, a triangle index of the reflected object, roughness of the reflected object, and a color of the reflected object.

Figure 14:
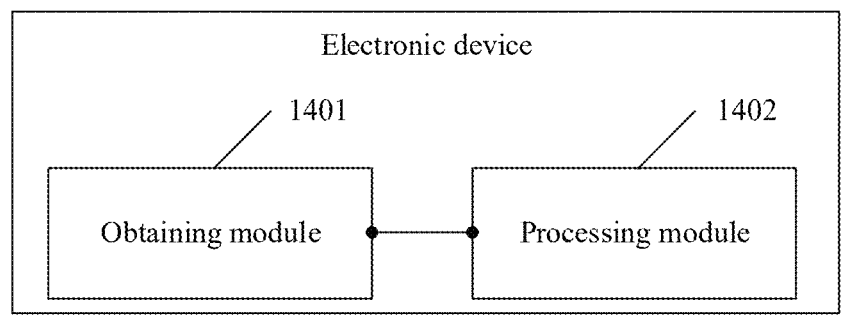
FIG. 14 is still another schematic structural diagram of an electronic device according to an embodiment of this application.

FIG. 14 is still another schematic structural diagram of an electronic device according to an embodiment of this application. As shown in FIG. 14, the electronic device includes an obtaining module 1401 and a processing module 1402.

The obtaining module 1401 is configured to obtain rendering information of a second reflecting object and rendering information of a reflected object.

The processing module 1402 is configured to perform rasterization separately based on the rendering information of the second reflecting object and the rendering information of the reflected object, and store an obtained image of the second reflecting object and an obtained image of the reflected object in a second frame buffer, where the second frame buffer is used for storing an image to be displayed.

The processing module 1402 is further configured to perform ray tracing based on the rendering information of the second reflecting object, and store an obtained image of a reflection in the second reflecting object in the second frame buffer, so that the image of the second reflecting object, the image of the reflected object, and the image of the reflection in the second reflecting object are fused to obtain a target image.

In an embodiment, the processing module 1402 is configured to: determine rendering information of a target area in the second reflecting object from the rendering information of the second reflecting object, where the target area in the second reflecting object includes the reflection in the second reflecting object; and perform the ray tracing based on the rendering information of the target area in the second reflecting object.

In an embodiment, the processing module 1402 is configured to: obtain a BVH tree and spatial information of a camera, where the BVH tree is constructed based on the rendering information of the reflected object, and the camera is configured to shoot the target image; determine spatial information of a maximum bounding volume from the BVH tree; and determine, based on the spatial information of the maximum bounding volume and the spatial information of the camera, the rendering information of the target area in the second reflecting object from the rendering information of the second reflecting object.

In an embodiment, the spatial information of the maximum bounding volume includes a vertical height of a first target point and coordinates of the first target point. The spatial information of the camera includes a vertical height of the camera and coordinates of the camera. The rendering information of the target area in the second reflecting object includes coordinates of a second target point, and the second target point satisfies the following conditions: a ratio of the vertical height of the camera to a first distance is equal to a ratio of the vertical height of the first target point to a second distance, the first target point is any vertex in the maximum bounding volume, the second target point is any vertex in the target area in the second reflecting object, the first distance is a distance between the second target point and the camera, the first distance is determined based on the coordinates of the second target point and the coordinates of the camera, the second distance is a difference between the first distance and a third distance, and the third distance is determined based on the coordinates of the camera and the coordinates of the first target point.

In an embodiment, the obtaining module 1401 is further configured to obtain rendering information of a first reflecting object, where a reflection type of the first reflecting object is different from a reflection type of the second reflecting object. The processing module 1402 is further configured to: perform ray tracing based on the rendering information of the first reflecting object, and store an obtained image of a reflection in the first reflecting object in a first frame buffer, where the first frame buffer is used for storing an image that does not need to be displayed temporarily; perform rasterization based on the rendering information of the first reflecting object, and store an obtained image of the first reflecting object in the second frame buffer; and obtain the image of the reflection in the first reflecting object from the first frame buffer, and store the image of the reflection in the first reflecting object in the second frame buffer, so that the image of the second reflecting object, the image of the reflected object, the image of the first reflecting object, the image of the reflection in the second reflecting object, and the image of the reflection in the first reflecting object are fused to obtain the target image.

In an embodiment, the processing module 1402 is configured to: determine rendering information of a target area in the first reflecting object from the rendering information of the first reflecting object, where the target area in the first reflecting object includes the reflection in the first reflecting object; and perform the ray tracing based on the rendering information of the target area in the first reflecting object.

In an embodiment, the processing module 1402 is configured to: obtain the BVH tree and the spatial information of the camera; determine the spatial information of the maximum bounding volume from the BVH tree; and determine, based on the spatial information of the maximum bounding volume and the spatial information of the camera, the rendering information of the target area in the first reflecting object from the rendering information of the first reflecting object.

In an embodiment, the rendering information of the target area in the first reflecting object includes coordinates of a third target point, and the third target point satisfies the following conditions: a ratio of the vertical height of the camera to a fourth distance is equal to a ratio of the vertical height of the first target point to a fifth distance, the third target point is any vertex in the target area in the first reflecting object, the fourth distance is a distance between the third target point and the camera, the fourth distance is determined based on the coordinates of the third target point and the coordinates of the camera, and the fifth distance is a difference between the fourth distance and the third distance.

In an embodiment, the rendering information of the second reflecting object includes metalness of the second reflecting object and roughness of the second reflecting object. The rendering information of the reflected object includes metalness of the reflected object and roughness of the reflected object. The rendering information of the first reflecting object includes metalness of the first reflecting object and roughness of the first reflecting object. The metalness of the first reflecting object is greater than or equal to a preset first threshold and is less than a preset second threshold. The metalness of the second reflecting object is greater than or equal to the preset second threshold. The metalness of the reflected object is less than the preset first threshold. The roughness of the second reflecting object is less than a preset third threshold. The roughness of the first reflecting object is greater than or equal to the preset third threshold.

In an embodiment, resolution of the image of the second reflecting object, resolution of the image of the reflected object, resolution of the image of the first reflecting object, and resolution of the image of the reflection in the second reflecting object are the same. Resolution of the image of the reflection in the first reflecting object is less than the resolution of the image of the first reflecting object.

In an embodiment, the rendering information of the second reflecting object further includes coordinates of a vertex of the second reflecting object, a vertex normal of the second reflecting object, a triangle index of the second reflecting object, and a color of the second reflecting object. Spatial information of the reflected object includes coordinates of a vertex of the reflected object, a vertex normal of the reflected object, a triangle index of the reflected object, and a color of the reflected object. Spatial information of the first reflecting object includes coordinates of a vertex of the first reflecting object, a vertex normal of the first reflecting object, a triangle index of the first reflecting object, and a color of the first reflecting object.

It should be noted that content such as information exchange between the modules/units of the apparatus and the execution processes thereof is based on the same idea as that of the method embodiments of this application, and produces the same technical effects as that of the method embodiments of this application. For content, refer to the foregoing descriptions in the method embodiments of this application. Details are not described herein again.

An embodiment of this application further relates to a computer-readable storage medium, including computer-readable instructions. When the computer-readable instructions are run on a computer, the computer is enabled to perform the method in the embodiment shown in FIG. 4, FIG. 8, or FIG. 10.

An embodiment of this application further relates to a computer program product, including computer-readable instructions. When the computer-readable instructions are run on a computer, the computer is enabled to perform the method in the embodiment shown in FIG. 4, FIG. 8, or FIG. 10.

It may be clearly understood by one of ordinary skilled in the art that, for convenient and brief description, for a detailed working process of the foregoing system, apparatus, and units, refer to a corresponding process in the foregoing method embodiments. Details are not described herein again.

In several embodiments provided in this application, it should be understood that the disclosed system, apparatus and method may be implemented in other manners. For example, the described apparatus embodiment is merely an example. For example, division into the units is merely logical function division and may be other division in actual implementations. For example, a plurality of units or components may be combined or integrated into another system, or some features may be ignored or not performed. In addition, the displayed or discussed mutual couplings or direct couplings or communication connections may be implemented via some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated units are implemented in the form of a software functional unit and sold or used as an independent product, the functions may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium, and includes several instructions for instructing a computer device (which may be a personal computer, a server, a network device, or the like) to perform all or a part of the operations of the methods described in embodiments of this application. The storage medium includes any medium that can store program code, such as a USB flash drive, a removable hard disk, a read-only memory (ROM), a random access memory (RAM), a magnetic disk, or an optical disc.

What is claimed is:

1. An image rendering method, comprising:
    obtaining rendering information of a reflecting object and rendering information of a reflected object;
    performing ray tracing based on the rendering information of the reflecting object, and storing an obtained image of a reflection in the reflecting object in a first frame buffer used for storing an image that does not need to be displayed temporarily;
    performing rasterization based on the rendering information of the reflecting object and the rendering information of the reflected object, and storing an obtained image of the reflecting object and an obtained image of the reflected object in a second frame buffer used for storing an image to be displayed; and
    obtaining, from the first frame buffer, the image of the reflection in the reflecting object, and storing the image of the reflection in the reflecting object in the second frame buffer, so that the image of the reflecting object, the image of the reflected object, and the image of the reflection in the reflecting object are fused to obtain a target image.

2. The method according to claim 1, wherein the performing ray tracing based on the rendering information of the reflecting object comprises:
    determining rendering information of a target area in the reflecting object from the rendering information of the reflecting object, wherein the target area in the reflecting object comprises the reflection in the reflecting object; and
    performing the ray tracing based on the rendering information of the target area in the reflecting object.

3. The method according to claim 2, wherein the determining rendering information of the target area in the reflecting object from the rendering information of the reflecting object comprises:
    obtaining a bounding volume hierarchy (BVH) tree and spatial information of a camera, wherein the BVH tree is constructed based on the rendering information of the reflected object, and the camera is configured to shoot the target image;
    determining spatial information of a maximum bounding volume from the BVH tree; and
    determining, based on the spatial information of the maximum bounding volume and the spatial information of the camera, the rendering information of the target area in the reflecting object from the rendering information of the reflecting object.

4. The method according to claim 3, wherein the spatial information of the maximum bounding volume comprises a vertical height of a first target point and coordinates of the first target point, wherein the spatial information of the camera comprises a vertical height of the camera and coordinates of the camera, wherein the rendering information of the target area in the reflecting object comprises coordinates of a second target point, and wherein the second target point satisfies:
    a ratio of the vertical height of the camera to a first distance is equal to a ratio of the vertical height of the first target point to a second distance, the first target point is any vertex in the maximum bounding volume, the second target point is any vertex in the target area in the reflecting object, the first distance is determined based on the coordinates of the second target point and the coordinates of the camera, the second distance is a difference between the first distance and a third distance, and the third distance is determined based on the coordinates of the camera and the coordinates of the first target point.

5. The method according to claim 1, wherein the rendering information of the reflecting object comprises metalness of the reflecting object, wherein the rendering information of the reflected object comprises metalness of the reflected object, wherein the metalness of the reflecting object is greater than or equal to a preset threshold, and wherein the metalness of the reflected object is less than the preset threshold.

6. The method according to claim 1, wherein resolution of the image of the reflecting object is the same as resolution of the image of the reflected object, and wherein resolution of the image of the reflection in the reflecting object is less than the resolution of the image of the reflecting object.

7. The method according to claim 5, wherein the rendering information of the reflecting object further comprises coordinates of a vertex of the reflecting object, a vertex normal of the reflecting object, a triangle index of the reflecting object, roughness of the reflecting object, and a color of the reflecting object; and wherein the rendering information of the reflected object further comprises coordinates of a vertex of the reflected object, a vertex normal of the reflected object, a triangle index of the reflected object, roughness of the reflected object, and a color of the reflected object.

8. An image rendering method, comprising:
    obtaining rendering information of a second reflecting object and rendering information of a reflected object;
    performing rasterization based on the rendering information of the second reflecting object and the rendering information of the reflected object, and storing an obtained image of the second reflecting object and an obtained image of the reflected object in a second frame buffer used for storing an image to be displayed; and
    performing ray tracing based on the rendering information of the second reflecting object, and storing an obtained image of a reflection in the second reflecting object in the second frame buffer, so that the image of the second reflecting object, the image of the reflected object, and the image of the reflection in the second reflecting object are fused to obtain a target image.

9. The method according to claim 8, wherein the performing ray tracing based on the rendering information of the second reflecting object comprises:
    determining rendering information of a target area in the second reflecting object from the rendering information of the second reflecting object, wherein the target area in the second reflecting object comprises the reflection in the second reflecting object; and
    performing the ray tracing based on the rendering information of the target area in the second reflecting object.

10. The method according to claim 9, wherein the determining rendering information of the target area in the second reflecting object from the rendering information of the second reflecting object comprises:
    obtaining a bounding volume hierarchy (BVH) tree and spatial information of a camera, wherein the BVH tree is constructed based on the rendering information of the reflected object, and the camera is configured to shoot the target image;

determining spatial information of a maximum bounding volume from the BVH tree; and determining, based on the spatial information of the maximum bounding volume and the spatial information of the camera, the rendering information of the target area in the second reflecting object from the rendering information of the second reflecting object.

11. The method according to claim 10, wherein the spatial information of the maximum bounding volume comprises a vertical height of a first target point and coordinates of the first target point, wherein the spatial information of the camera comprises a vertical height of the camera and coordinates of the camera, wherein the rendering information of the target area in the second reflecting object comprises coordinates of a second target point, and wherein the second target point satisfies:

a ratio of the vertical height of the camera to a first distance is equal to a ratio of the vertical height of the first target point to a second distance, the first target point is any vertex in the maximum bounding volume, the second target point is any vertex in the target area in the second reflecting object, the first distance is determined based on the coordinates of the second target point and the coordinates of the camera, the second distance is a difference between the first distance and a third distance, and the third distance is determined based on the coordinates of the camera and the coordinates of the first target point.

12. The method according to claim 11, further comprising:

obtaining rendering information of a first reflecting object, wherein a reflection type of the first reflecting object is different from a reflection type of the second reflecting object;

performing ray tracing based on the rendering information of the first reflecting object, and storing an obtained image of a reflection in the first reflecting object in a first frame buffer used for storing an image that does not need to be displayed temporarily;

performing rasterization based on the rendering information of the first reflecting object, and storing an obtained image of the first reflecting object in the second frame buffer; and obtaining the image of the reflection in the first reflecting object from the first frame buffer, and storing the image of the reflection in the first reflecting object in the second frame buffer, so that the image of the second reflecting object, the image of the reflected object, the image of the first reflecting object, the image of the reflection in the second reflecting object, and the image of the reflection in the first reflecting object are fused to obtain the target image.

13. The method according to claim 12, wherein the performing ray tracing based on the rendering information of the first reflecting object comprises:

determining rendering information of a target area in the first reflecting object from the rendering information of the first reflecting object, wherein the target area in the first reflecting object comprises the reflection in the first reflecting object; and performing the ray tracing based on the rendering information of the target area in the first reflecting object.

14. The method according to claim 13, wherein the determining rendering information of a the target area in the first reflecting object from the rendering information of the first reflecting object comprises:

obtaining the BVH tree and the spatial information of the camera;

determining the spatial information of the maximum bounding volume from the BVH tree; and determining, based on the spatial information of the maximum bounding volume and the spatial information of the camera, the rendering information of the target area in the first reflecting object from the rendering information of the first reflecting object.

15. The method according to claim 14, wherein the rendering information of the target area in the first reflecting object comprises coordinates of a third target point, and the third target point satisfies:

a ratio of the vertical height of the camera to a fourth distance is equal to a ratio of the vertical height of the first target point to a fifth distance, the third target point is any vertex in the target area in the first reflecting object, the fourth distance is determined based on the coordinates of the third target point and the coordinates of the camera, and the fifth distance is a difference between the fourth distance and the third distance.

16. The method according to claim 12, wherein the rendering information of the second reflecting object comprises metalness of the second reflecting object and roughness of the second reflecting object, wherein the rendering information of the reflected object comprises metalness of the reflected object and roughness of the reflected object, and wherein the rendering information of the first reflecting object comprises metalness of the first reflecting object and roughness of the first reflecting object;

the metalness of the first reflecting object is greater than or equal to a preset first threshold and is less than a preset second threshold, the metalness of the second reflecting object is greater than or equal to the preset second threshold, and the metalness of the reflected object is less than the preset first threshold; and the roughness of the second reflecting object is less than a preset third threshold, and the roughness of the first reflecting object is greater than or equal to the preset third threshold.

17. The method according to claim 12, wherein resolution of the image of the second reflecting object, resolution of the image of the reflected object, resolution of the image of the first reflecting object, and resolution of the image of the reflection in the second reflecting object are the same, and wherein resolution of the image of the reflection in the first reflecting object is less than the resolution of the image of the first reflecting object.

18. The method according to claim 16, wherein the rendering information of the second reflecting object further comprises coordinates of a vertex of the second reflecting object, a vertex normal of the second reflecting object, a triangle index of the second reflecting object, and a color of the second reflecting object; wherein spatial information of the reflected object comprises coordinates of a vertex of the reflected object, a vertex normal of the reflected object, a triangle index of the reflected object, and a color of the reflected object; and wherein spatial information of the first reflecting object comprises coordinates of a vertex of the first reflecting object, a vertex normal of the first reflecting object, a triangle index of the first reflecting object, and a color of the first reflecting object.

19. An electronic device, comprising:
a processor,
a memory coupled to the processor to store instruction, which when the code is executed by the processor, cause the electronic device to perform operations, the operations comprising:
obtaining rendering information of a reflecting object and rendering information of a reflected object;
performing ray tracing based on the rendering information of the reflecting object, and storing an obtained image of a reflection in the reflecting object in a first frame buffer used for storing an image that does not need to be displayed temporarily;
performing rasterization based on the rendering information of the reflecting object and the rendering information of the reflected object, and storing an obtained image of the reflecting object and an obtained image of the reflected object in a second frame buffer used for storing an image to be displayed; and
obtaining, from the first frame buffer, the image of the reflection in the reflecting object, and storing the image of the reflection in the reflecting object in the second frame buffer, so that the image of the reflecting object, the image of the reflected object, and the image of the reflection in the reflecting object are fused to obtain a target image.

20. A non-transitory computer-readable storage medium, comprising computer-readable instructions, wherein when the computer-readable instructions are run on a computer, the computer is enabled to perform the method according to claim 1.

\* \* \* \* \*

UNITED STATES PATENT AND TRADEMARK OFFICE
CERTIFICATE OF CORRECTION

| | | |
|---|---|---|
| PATENT NO. | : 12,374,023 B2 | Page 1 of 1 |
| APPLICATION NO. | : 18/214634 | |
| DATED | : July 29, 2025 | |
| INVENTOR(S) | : Xindong Shi et al. | |

It is certified that error appears in the above-identified patent and that said Letters Patent is hereby corrected as shown below:

In the Claims

Claim 19, Column 39, Lines 3-4, delete "to store instruction, which when the code is executed" and insert --to store instructions, which when executed--

Signed and Sealed this
Eighteenth Day of November, 2025

John A. Squires
*Director of the United States Patent and Trademark Office*